US005612763A

United States Patent [19]
Uchiyama

[11] Patent Number: 5,612,763
[45] Date of Patent: Mar. 18, 1997

[54] FOCUS DETECTION DEVICE AND METHOD

[75] Inventor: Shigeyuki Uchiyama, Tokyo, Japan

[73] Assignee: Nikon Corporation, Tokyo, Japan

[21] Appl. No.: 497,171

[22] Filed: Jun. 30, 1995

[30] Foreign Application Priority Data

Sep. 28, 1994 [JP] Japan .................................. 6-233152

[51] Int. Cl.$^6$ ...................................................... G03B 3/00
[52] U.S. Cl. ............................................................ 396/126
[58] Field of Search .................................... 354/400–409

[56] References Cited

U.S. PATENT DOCUMENTS

| | | |
|---|---|---|
| 4,561,749 | 12/1985 | Utagawa . |
| 5,068,682 | 11/1991 | Utagawa . |
| 5,258,801 | 11/1993 | Kusaka et al. . |
| 5,389,995 | 2/1995 | Uchiyama . |
| 5,469,240 | 11/1995 | Uchiyama et al. ................... 354/406 |
| 5,481,329 | 1/1996 | Uchiyama et al. ................... 354/402 |
| 5,483,318 | 1/1996 | Hamada et al. ...................... 354/402 |
| 5,485,002 | 1/1996 | Kusaka ............................... 250/201.8 |
| 5,485,003 | 1/1996 | Kusaka ............................... 250/201.8 |

FOREIGN PATENT DOCUMENTS

| | | |
|---|---|---|
| 60-37513 | 2/1985 | Japan . |
| 60-262004 | 12/1985 | Japan . |
| 61-245123 | 10/1986 | Japan . |
| 2-135311 | 5/1990 | Japan . |
| 2-178641 | 7/1990 | Japan . |
| 4-235512 | 8/1992 | Japan . |

*Primary Examiner*—David M. Gray
*Assistant Examiner*—Eric Nelson
*Attorney, Agent, or Firm*—Oliff & Berridge

[57] ABSTRACT

A focus detection device is disclosed that establishes a focus detection algorithm range on photoelectric conversion element arrays and detects the contrast distribution of the output signal strings of the arrays corresponding to this algorithm range. Moreover, the focus detection device determines transformation coefficients for the algorithm range based on a detected contrast distribution and coefficients predefined for some of a plurality of photo-electric conversion elements of the photo-electric conversion element arrays. The focus detection device computes the relative shift amount of the output signal strings corresponding to the algorithm range, and converts the shift amount into a defocus amount of a shooting lens based on the determined transfer coefficients. Moreover, while relatively shifting the pair of output signal strings of the pair of photo-electric conversion element arrays by a specific amount within the predetermined shift range, the invention computes a correlation-amount at each shift position and detects the focus adjustment condition of the shooting lens based on the shift position yielding the minimum correlation amount. The detected focus adjustment condition is determined to have a high level of confidence if the amount of change in the correlation amount in the vicinity of the shift position yielding the relatively minimum correlation amount satisfies specified conditions.

24 Claims, 18 Drawing Sheets

FOCUS DETECTION DEVICE AND METHOD

BACKGROUND

1. Field of the Invention

The present invention relates to a focus detection device used in cameras and in video equipment.

2. Background of Related Art

A focus detection device of a camera using a phase differential detection method is well known. FIG. 14 illustrates such a device. Light rays entering from a region 101 in the shooting lens 100 pass through a field mask 200, a field lens 300, an aperture stop unit 401, and a re-imaging lens 501. The image is composed on an image sensor array having a plurality of photo-electric conversion elements arranged in a one-dimensional line forming a row (shown as row A). The image sensor array produces an output corresponding to the incident intensity of the light rays. Similarly, light rays entering from a region 102 in the shooting lens 100 pass through the field mask 200, the field lens 300, the aperture stop unit 402, and the re-imaging lens 502 and compose an image on a row B of photo-electric conversion elements.

The pair of object images composed on the image sensor arrays rows A and B move away from each other during the so-called front focus condition in which the shooting lens 100 composes a clear image of the object in front of the predetermined focus surface. Conversely, the pair of object images move toward each other during the so-called rear focus condition in which the shooting lens 100 composes a clear image of the object in the back of the predetermined focus surface. The object images on the image sensor arrays rows A and B relatively coincide with each other during the so-called in-focus condition in which a clear image of the object is composed on the predetermined focus surface. Therefore, the focus adjustment of the shooting lens 100, in particular, and the amount and the direction of the deviation from the in-focus condition (hereafter "defocus amount") in the present invention can be determined by obtaining the relative position shift of the pair of object images. This is accomplished by converting the pair of object images into electric signals through photo-electric conversion using each row of photo-electric conversion elements of the image sensor rows A and B, and by performing algorithm processing on these signals.

Thus, projected images from the re-imaging lenses 501 and 502 on the image sensor rows A and B coincide with each other in the vicinity of the predetermined focus surface. This generally is the central region in the shooting field, as described in FIG. 13. This region is designated as a focus detection area.

The algorithm processing method for obtaining the defocus amount is described hereafter.

The image sensor rows A and B are each composed of a plurality of photo-electric conversion elements that output a plurality of output signal strings $a[1], \ldots, a[n]$ and $b[1], \ldots, b[n]$, respectively, as shown in FIGS. 15(a) and 15(b). A correlation algorithm relatively shifts the data within a specified range of the pair of output signal strings by a predetermined amount L. Letting the maximum shift amount be lmax, the range of L becomes $-lmax$ to $lmax$. Specifically, the correlation amount C[L] is computed using formula 1.

$$C[L] = \Sigma |a[i+L] - b[i]| \tag{1}$$

where $L = -lmax, \ldots, -2, -1, 0, 1, 2, \ldots, lmax$ and $\Sigma$ denotes the total sum over $i = k$ to $r$.

In formula 1, L is an integer corresponding to the shift amount of the output data strings as described above. The first term k and the last term r vary depending on the shift amount L, as described in formula 2.

If $L \geq 0$, $$k = k0 + INT\{-L/2\}$$

$$r = r0 + INT\{-L/2\}$$

If $L < 0$, $$k = k0 + INT\{(-L+1)/2\}$$

$$r = r0 + INT\{(-L+1)/2\}, \tag{2}$$

where k0 and r0 denote the first term and the last term, respectively, when the shift amount L is equal to 0.

FIGS. 16(a)–16(e) describe a combination of signals used to compute the absolute value of the difference between row A signals and row B signals in formula 1 and the algorithm range of adding the absolute values of these differences when the initial term k and the last term r are varied by formula 2. As shown in these figures, the ranges used for rows A and B in the correlation algorithm shift in opposite directions with changes in the shift amount L.

There is also a known method in which the first term k and the last term r are fixed regardless of the shift amount L. In this method, the range used in the correlation algorithm of one of the rows is held constant and only the range of the other row shifts. The shift amount of the relative position becomes the shift amount L when a pair of data coincide. Hence, the shift amount corresponding to the minimum correlation amount among the determined correlation amounts C[L] is detected.

The shift amount is multiplied by a constant, which is determined by the pitch width of the photo-electric conversion elements in the image sensor array and the particular optical system used, to determine a defocus amount. Thus, a larger defocus amount can be detected by making the maximum shift value lmax larger.

The correlation amount C[L] is discrete, as shown in FIG. 15(c), and the minimum unit of detectable defocus amount is limited by the pitch width of the photo-electric conversion elements of the image sensor rows A and B. A method in which precise focus detection is obtained by performing an interpolation algorithm based on the discrete correlation amounts C[L] is disclosed by the assignee of the present invention in Japanese Unexamined Patent Publication Sho 60-37513, corresponding to U.S. Pat. No. 4,561,749. In this method, a true local minimum correlation amount Cex and a shift amount Ls that corresponds to Cex are computed by formulae 3 and formula 4 using the local minimum correlation amount C[l] and correlation amounts C[l+1] and C[l−1], with shift amounts on both sides of C[l], as shown in FIG. 17.

$$DL = (C[l-1] - C[l+1])/2$$

$$Cex = C[l] - |DL|$$

$$E = MAX\{C[l+1] - C[l], C[l-1] - C[l]\} \tag{3}$$

$$Ls = l + DL/E \tag{4}$$

In formulae 3, MAX{Ca, Cb} is evaluated as the larger of Ca and Cb. Finally, the defocus amount DF is computed from the shift amount Ls using formula 5.

$$DF = Kf \times Ls \qquad (5)$$

where Kf is a constant determined by the pitch width of the photo-electric conversion elements and the optical system used.

The defocus amount thus obtained needs to be further evaluated as to its reliability, ie., whether it is a true defocus amount or whether it is the result of fluctuations in the correlation amounts caused by noise and the like. If the obtained defocus amount satisfies the conditions of formula 6, it is considered reliable, i.e., there is a high level of confidence in the obtained defocus amount.

$$E > E1 \text{ and } Cex/E < G1 \qquad (6)$$

where E1 and G1 are predetermined threshold values. Value E describes changes in the correlation amount which depend on the contrast of the object. As the value of E becomes larger, the contrast becomes larger and the confidence level becomes higher. Cex is the difference of the pair of data when the data are closest to each other. Ideally, Cex should be 0. However, due to noise and the visual difference between region 101 and region 102, there is a minute difference between the pair of object images; hence Cex is never 0 in reality. As the contrast of the object becomes higher, the effect of noise and the difference in object images becomes smaller. Therefore, Cex/E is used to denote the level of coincidence of the pair of data. Naturally, as the value of Cex/E approaches 0, the level of coincidence of the pair of data, and the level of confidence become higher.

Another known method for determining reliability computes the contrast for one of the pair of data instead of using the value E to determine confidence.

If the defocus amount is determined to be reliable, driving or display of the shooting lens 100 is executed based on the defocus amount DF. The correlation algorithm, the interpolation algorithm, and the determination of conditions associated with formula 1 through formula 6 above will be collectively referred to hereafter as the focus detection algorithm.

The focus detection optical system and the image sensor, in general, are structured in such a manner that a pair of data coincide with each other if the shooting lens 100 is in the in-focus condition and the shift amount L is approximately 0. Therefore, unless the object image is formed within the range of k0 to r0 with shift amounts L equalling 0 when the shooting lens is in the in-focus condition, the shooting lens 100 cannot be focused on the object. In other words, the region in which focus detection is performed is determined by the k0 and r0. Hereafter, the data region between k0 and r0 at shift amount L=0 will be referred to as the algorithm range. If the object is found in a region corresponding to the algorithm range in the shooting field, focus detection is to be performed on the object and the region becomes the focus detection area. This focus detection area is displayed in FIG. 13 as a focus detection frame enclosed by a real line in the center of the finder screen of the camera. The photographer can focus the shooting lens on the desired object by capturing it within this detection frame.

In the focus detection device described above, if a plurality of objects with different distances are composed on the image sensor arrays, due to the difference in shift amounts of a pair of output signals depending on the position of the sensor, no pair of output signals have the same shift amounts. Thus, sometimes focus detection becomes impossible because the value of Cex is too large, and Cex/E does not satisfy the conditions of formula 6. Thus, a method is disclosed in Japanese Unexamined Patent Publication Sho 60-262004 in which the focus detection area is further subdivided by dividing a pair of image sensor arrays into a plurality of blocks, with the focus detection algorithm performed on each of these blocks to compute the defocus amount Df. A block is selected from the plurality of blocks having, for example, the largest amount of information or the defocus amount representing the shortest distance. The defocus amount of the selected block is designated as the focus adjustment condition of the shooting lens, and driving or display of the shooting lens is executed based on the defocus amount.

In dividing a pair of image sensor arrays into a plurality of blocks, a plurality of sets are formed having k0 and r0 with shift amount L=0 in the correlation algorithm of formula 1 described above. For example, as described in FIG. 12(a), in dividing a pair of image sensor arrays each consisting of 46 data, into five blocks, wherein each block consists of eight data, the defocus amount DF is computed using the focus detection algorithm of formulae 1–6 with k0=4 and r0=11 in block 1. Similarly, the defocus amount of each block is computed using the focus detection algorithm of formulae 1–6 with (k0=12, r0=19), (k0=20, r0=27), (k0=28, r0=35), (k0=36, r0=43), respectively, in blocks 2, 3, 4, and 5.

As described in FIG. 12 (b), wider blocks are formed in the same pair of image sensor arrays than the example shown in FIG. 12(a) by setting (k0=3, r0=16) for block 1, (k0=17, r0=30) for block 2, and (k0=31, r0=44) for block 3, thus forming three blocks, each with 14 data.

When the boundary positions of the blocks are fixed in this manner, sometimes focus detection becomes impossible or the algorithm results are unstable due to the existence of object contrast at the boundaries of the blocks. Hence, a method is disclosed in Japanese Unexamined Patent Publication Hei 2-135311, corresponding to U.S. Pat. No. 5,068,682, in which the absolute value of the difference between adjacent data for the vicinity of a block boundary is computed, and the boundary position is moved so that the section where the absolute value of the difference assumes the minimum value becomes the boundary of the blocks.

In the explanation described above, the output signal strings of the image sensor rows A and B, i.e., $a[1], \ldots, a[n]$ and $b[1], \ldots, b[n]$, are used directly. However, sometimes correct focus detection is impossible due to the effects of frequency components of the object that are higher than the Nyquist frequency or due to the effects of unbalance in the output of rows A and B. A method in which a filter algorithm process is performed on the output signal strings and the focus detection algorithm is performed using the resulting filtered data is disclosed by the assignee of the present invention in Japanese Unexamined Patent Publication Sho 61-245123. For example, to eliminate frequency components higher than the Nyquist frequency, the filter processing algorithm of formulae 7 is executed resulting in the filter processed data $Pa[1], \ldots, Pa[n-2]$ and $Pb[1], \ldots, Pb[n-2]$ from the output signal strings $a[1], \ldots, a[n]$ and $b[1], \ldots, b[n]$, respectively.

$$Pa[i] = (a[i] + 2 \times a[i+1] + a[i+2])/4$$

$$Pb[i] = (b[i] + 2 \times b[i+1] + b[i+2])/4, \qquad (7)$$

where i=1 to n−2.

Next, by performing a DC-eliminating filter processing algorithm (i.e. a filtering process for eliminating the DC component) using formulae 8 to eliminate the effects of the unbalanced output from rows A and B, for example, on the filter processed data Pa[1], . . . ,Pa[n−2] and Pb[1], . . . ,Pb[n−2], the filter processed data Fa[1], . . . ,Fa[n−2] and Fb[1], . . . ,Fb[n−2], respectively, are obtained.

$$Fa[i]=-Pa[i]+2\times Pa[i+s]-Pa[i+2s]$$

$$Fb[i]=-Pb[i]+2\times Pb[i+s]-Pb[i+2s], \quad (8)$$

where l=1 to n−2−2s.

In formulae 8, s represents integers from 1 to approximately 10, and as s becomes larger, the frequency component of the object pattern extracted becomes lower. Conversely, as s becomes smaller, the frequency of the object pattern extracted becomes higher. Moreover, as s becomes larger, the number of data being filter processed becomes smaller.

In the near in-focus condition, the object image contains more of the high frequency components; therefore, a relatively smaller value of s is preferred. In the out-of-focus condition, the object image is blurred and only low frequency components remain; therefore, a larger value of s is preferred. If s is small, almost all the low frequency components are eliminated. Therefore, in the case of the absence of high frequency components, for example, when the defocus amount is large, detection becomes impossible. Consequently, making the maximum shift number lmax in formula 1 large is meaningless, and a relatively smaller value of s is preferred. On the other hand, if s is large, because the low frequency components are extracted, detection is possible even if the defocus amount is large. Accordingly, a relatively large value is set for lmax.

Furthermore, when the value of s is relatively large, sometimes the number of data is reduced by half by using every other datum from the DC-eliminating filter-processed data Fa[i] and Fb[i]. In this case, since one datum contains the width of two pixels, half of the algorithm range is required for the same detection region, compared to the case in which all the data are used. This reduces algorithm processing time. Moreover, the shift amount 1 in the case when every other datum is used is equivalent to the shift amount 2 in the case when every datum is used, enabling detection of the same defocus amount even with reduction of the maximum shift number by half.

FIGS. 18(a)–18(c) describe the output signal string, the filter processed data for the output signal with s=2, and the filter processed data with s=8, respectively, of an output of a image sensor array for a object having only low frequency components. The shooting lens is assumed to be in the in-focus condition, and thus, the output signal string of row A is assumed to coincide with that of row B.

The filter processed data for s=2 are flat with hardly any contrast. However, by making s=8, the contrast becomes sufficient and results in a defocus amount with a high level of confidence.

Comparing the narrow algorithm range ce1 and the wide algorithm range ce2, as shown in FIG. 18(c), the wide algorithm range ce2 contains more contrast than the narrow algorithm range. Therefore, the wider algorithm range is more advantageous for the focus detection algorithm for which low frequency components are extracted.

FIGS. 19(a)–19(c) describe the output signal string, the filter processed data for the output signal with s=2, and the filter processed data with s=8, respectively, of an output of a image sensor array for an object having only high frequency components. Again, the shooting lens is assumed to be in the in-focus condition, and the output signal string of row A is assumed to coincide with that of row B.

For an object pattern consisting only of high frequency components, by making s=2, the contrast becomes sufficient and results in a defocus amount with a high level of confidence.

Comparing the narrow algorithm range ce1 and the wide algorithm range ce2, as described in FIG. 18(b), both algorithm ranges contain the same amount of contrast. However, because a narrow algorithm range is less effected by noise than a wide algorithm range, and since a wide algorithm range may result in the failure of focus detection due to the existence of multiple objects with different distances, the narrow algorithm range is preferred for filter processed data for which high frequency components are extracted.

FIGS. 20(a)–20(c) describe the output signal string, the filter processed data for the output signal with s=2, and the filter processed data with s=8, respectively, of an image sensor output for an object having both high and low frequency components. Again, the shooting lens is assumed to be in the in-focus condition, and the output signal string of row A is assumed to coincide with that of row B.

For an object pattern having both high frequency components and low frequency components, sufficient contrast is obtained regardless of the value of s. Moreover, the range of contrast distribution of the pattern becomes larger as the value of s increases.

FIGS. 21(a)–21(c) describe the output signal string, the filter processed data for the output signal with s=2, and the filter processed data with s=8, respectively, of an image sensor output for a subject, such as a chimney, for which the shooting lens deviates substantially from the in-focus condition. Here, the output signal string of row A is displayed by a real line, while that of row B is displayed by a dotted line.

When the shooting lens deviates substantially from the in-focus condition, very little amounts of high frequency components are present in the output signal and contrast is not obtained for the filter processed data with s=2. However, sufficient contrast is obtained with filter processed of s=8, and a defocus amount is obtained by making the maximum shift amount lmax sufficiently large.

Because the frequency components vary depending on the object, a method exists wherein s is first set to s=2. Thus, the filter processed data based on the extraction of high frequency components are output, and the process is concluded if a defocus amount with a high level of confidence can be obtained by conducting the focus detection algorithms of formulae 1 to 6 using this filter processed data. If a defocus amount with a high level of confidence cannot be obtained, s is set to s=4, filter processed data based on lower frequency components are output, and reliability is again evaluated. The process is repeated with increasing values of s until a reliable defocus amount is obtained.

With this method, when the high frequency components are extracted initially near the in-focus state of a normal subject, e.g, the pattern of FIG. 20(a), it is possible to obtain a defocus amount with a high level of reliability with the focus detection algorithms using filter processed data with s=2. Consequently, it is possible to conduct focus detection within a short time. In addition, when the subject is the face of a person or the like and has only low frequency components, e.g., the pattern shown in FIG. 18(a), it is possible to obtain a defocus amount with a high level of reliability using the filter processed data based on the extraction of low frequency components.

When the defocus amount is large, such as in FIG. 21(a), the defocus amount is computed by increasing the maximum shift number lmax using the filter processed data for which low frequency components are extracted and then conducting the focus detection algorithms. When this is done, it is possible to shorten the processing time of the algorithm near the in-focus state, easily follow an object when the object is moving, and focus even when the object includes only low frequency components. Consequently, it becomes possible to detect even large defocus amounts.

In general, the precision of the defocus amounts obtained when the object includes high frequency components is better than when the object includes only low frequency components. Therefore, by initially conducting focus detection using the filter processed data based on the extraction of high frequency components, it becomes possible to obtain defocus amounts with good precision.

With focus detection conducted in blocks, a method is disclosed in Japanese Unexamined Patent Publication Hei 6-82686, corresponding to U.S. Pat. No. 5,389,995, wherein s is initially set to s=2, filter processing is performed to extract high frequency components, and focus detection algorithms are conducted on each block using this filter processed data. The process is concluded if a block exists in which a defocus amount with a high level of confidence is obtained. If a high level of confidence is not obtained, s is set to s=4, filter processing is performed to extract low frequency components, and focus detection algorithms are conducted on each block using this filter processed data. The filter processing is repeated with increasing values of s until a block exists in which a defocus amount with a high level of confidence is obtained.

In the focus detection device disclosed in the above-described Japanese Unexamined Patent Publication Hei 2-135311, the absolute value of the difference between adjacent data near the boundary of the block is computed, and the boundary position is moved so that the block boundary becomes the position where the absolute value of the difference becomes the minimum value. A method is disclosed in the above-described Japanese Unexamined Patent Publication Hei 6-82686 wherein when the filter processed data for which DC components are completely eliminated are divided into a plurality of blocks, the absolute value of the difference between the data near the block boundary and a predetermined value is computed, and the block boundary position is set on the basis of the absolute value of this difference.

The filter processes of formulae 8 are processes that completely eliminate the DC component. When focus detection algorithms are conducted using filter processed data that completely eliminate the DC component, the problem arises that the possibility of a false focus is greater than when data is used in which the DC component remains. This problem will be described with reference to FIGS. 22(a)–22(d).

FIGS. 22(a) and 22(b) illustrate output signals from the image sensor rows A and B corresponding to a viewed object wherein the luminosity changes in steps from left to right across the focus detection area. The patterns in 22(a) and 22(b) match at the portions indicated by the arrows. As shown, the output of image sensor array row A is shifted to the left with respect to the output of row B. FIGS. 22(c) and 22(d) are the filtered data patterns corresponding to FIGS. 22(a) and 22(b), respectively, for which the DC component is completely eliminated. Because only the DC component differs between the data in FIGS. 22(a) and 22(b), the filtered data is the same when the DC component is completely eliminated. Hence, when focus detection is conducted using these filtered data, the determination is made that the object is in focus because the pair of data relatively agree. Consequently, different object patterns may appear similar. This is particularly noticeable when the algorithm range is made narrower by conducting block division as described above.

To overcome this problem, a method is disclosed in the above-described Japanese Unexamined Patent Publication Hei 6-82686 wherein DC reduction filter processing is conducted which does not completely eliminate the DC component, using Formulae 9, to obtain the DC reduction filter processed data Qa[i] and Qb[i].

$$Qa[i]=-Pa[i]+4\times Pa[i+y]-pa[i+2y]$$
$$Qb[i]=-Pb[i]+4\times Pb[i+y]-Pb[i+2y] \quad (9)$$

where i=1 to n−2−2y.

In focus detection devices which conduct block division and then conduct the focus detection algorithms for each block, methods of determining a single final defocus amount from the plurality of defocus amounts, other than the above-described methods of selecting the defocus amount indicating the closest distance or selecting the defocus amount of the block where the information value E is largest, are disclosed in Japanese Unexamined Patent Publication Hei 2-178641, corresponding to U.S. Pat. No. 5,258,801, and Hei 4-235512. These methods select a block satisfying predetermined conditions as a standard block, set the defocus amount of the standard block as the standard defocus amount, conduct a weighing coefficient determination on the basis of the amount of difference between the various defocus amounts and the standard defocus amount, and find a weighted average of the plurality of defocus amounts using this weighing coefficient in order to compute the final defocus amount. The predetermined conditions for the standard block include a block that indicates a defocus amount having a closest distance. For example, when the amount of difference is small, the weighing coefficient is increased, and when the amount of difference is large, the weighing coefficient is decreased.

With this method, when a plurality of objects of differing distances are intermixed, it is possible to obtain a defocus amount relating to each of the objects. When the object is flat, such as a wall or the like, it is possible to obtain a stable defocus amount because the whole is averaged. The combined defocus amount Dfm, and the combined information amount Em can be obtained using formulae 10 below.

$$Dfm=\Sigma (Df[j]\times E[j]\times W[j])/\Sigma (E[j]\times W[j])$$
$$Em=\Sigma (E[j]\times W[j]) \quad (10)$$

where j=1 to h, h is the number of blocks, Df[j] is the defocus amount, and E[j] is the information amount E of block j.

The weighing coefficient W[j] is determined as shown in FIG. 11 from the difference between Dfk (the standard defocus amount) and Df[j] and has a value between 0 and 1. ML and UL are predetermined values so that W[j] is: 1 when the absolute value of the difference in the defocus amounts is not greater than ML, 0 when UL is exceeded, and changes in a linear manner between ML and UL. This indicates that Df[j] is not used in the combining algorithm when W[j] is 0.

The combined defocus amount Dfm obtained in this way is the final defocus amount. It is preferable for the value of ML to be a value between 30 μm and 50 μm, and for the value of UL to be between 80 μm and 140 μm.

However, the following problems occur in the conventional focus detection device described above.

First, the K-factor Kf in formula 5 differs in actuality depending on the position within the focus detection area. This is caused by the difference in magnification depending on the location within the focus detection area due to the distortion aberration of the focus detection optical system. In general, the K-factor Kf becomes larger as the distance from the center of the focus detection area increases. Therefore, it becomes necessary to change the K-factor Kf corresponding to the position where the object image is formed on the image sensor array.

In order to solve such a problem, the focus detection device disclosed in the above-described Japanese Unexamined Patent Publication Hei 2-135311 establishes a K-factor for each block and computes a defocus amount for each block using the K-factor for that block. However, this method is unstable when an object contrast exists in the boundary section of the block because the K-factor used depends on which block contains the contrast.

Second, if the information amount E exceeds the threshold value E1 only slightly and Cex/E falls below the threshold value G1 only slightly in the determination by the formulae 6, the defocus amount is determined to have a high level of confidence even though the defocus amount may be unstable.

To overcome this, a stricter threshold value E1' may be used in place of the threshold value E1 of the information amount. Consequently, even when the information amount exceeds the threshold value E1 slightly and Cex/E falls substantially below the threshold value G1, the defocus amount is determined to lack a sufficient level of confidence since the information amount E falls below the threshold value E1'. The same types of problems occur when a stricter threshold value G1 is used for the threshold value of Cex instead of changing the threshold value E1, or when both E1 and G1 are replaced by stricter values E1' and G1'.

SUMMARY OF THE INVENTION

It is an object of the present invention to provide a focus detection device which can detect a stable defocus amount with a high level of confidence.

In order to achieve the above and other objectives, the focus detection device according to an embodiment of the invention incudes a pair of photoelectric conversion element arrays consisting of a plurality of photo-electric conversion elements which output a pair of signal strings corresponding to the light intensity distribution of a pair of object images. A focus detection optical system guides a pair of light rays from the object to the pair of photo-electric conversion element arrays and an algorithm range establishing device establishes the focus detection algorithm range on the photo-electric conversion element arrays based on the signal strings outputted from the photo-electric conversion arrays. A contrast detection device detects the contrast distribution of the output signal strings corresponding to the algorithm range, and a transformation coefficient determination device determines the transformation coefficient of the algorithm range based on the detected contrast distribution and the coefficients predefined for each of the plurality of photo-electric conversion elements. A focus detection algorithm computes the relative shift amount of a pair of output signal strings corresponding to the algorithm range and transforms the shift amount into a defocus amount of the optical system.

In accordance with another embodiment of the invention, a filter process device is provided to filter process the pair of signal strings output from the pair of photo-electric conversion element arrays and to output a pair of filter processed data strings. The algorithm range determination device, the contrast detection device, and the focus detection algorithm device use the pair of filter processed data.

In accordance with another embodiment of the invention, the contrast detection device detects the location of the center of the contrast based on the output signal strings corresponding to the algorithm range. The transformation coefficient determination device computes the transfer coefficient based on of the location of the center of the contrast and the coefficients predefined for some of the plurality of photo-electric conversion elements.

In accordance with a still further embodiment, the focus detection device includes a pair of photo-electric conversion element arrays consisting of a plurality of photo-electric conversion elements which output a pair of signal strings corresponding to the light intensity distribution of a pair of object images. A focus detection optical system guides a pair of light rays from the object to the pair of photo-electric conversion element arrays. A focus detection algorithm device shifts a pair of output signal strings of the pair of photo-electric conversion element arrays relative to each other by a specified amount within the predetermined shift range, computes the correlation amount at each shift position, and detects the focus adjustment condition of the focus detection device based on the shift position corresponding to the local minimum correlation amount. A confidence level determination device determines that the focus adjustment condition detected by the focus detection algorithm device has a high level of confidence when the following conditions are satisfied:

E>E1 and (Cex+Ct1)/E<G1, where: Cex is the minimum computed correlation amount; E is an amount of change in the correlation amount in the vicinity of the minimum correlation amount Cex; and Ct1, E1, and G1 are predetermined values.

In accordance with another embodiment of the invention, the predetermined value Ct1 is a function of the threshold values E1 and G1.

BRIEF DESCRIPTION OF THE DRAWINGS

The invention will be described in detail with reference to the following drawings in which like reference numbers refer to like elements and wherein.

DETAILED DESCRIPTION OF THE PREFERRED EMBODIMENTS

A preferred embodiment of the present invention is described hereafter, with reference to the drawings.

Figure 1:
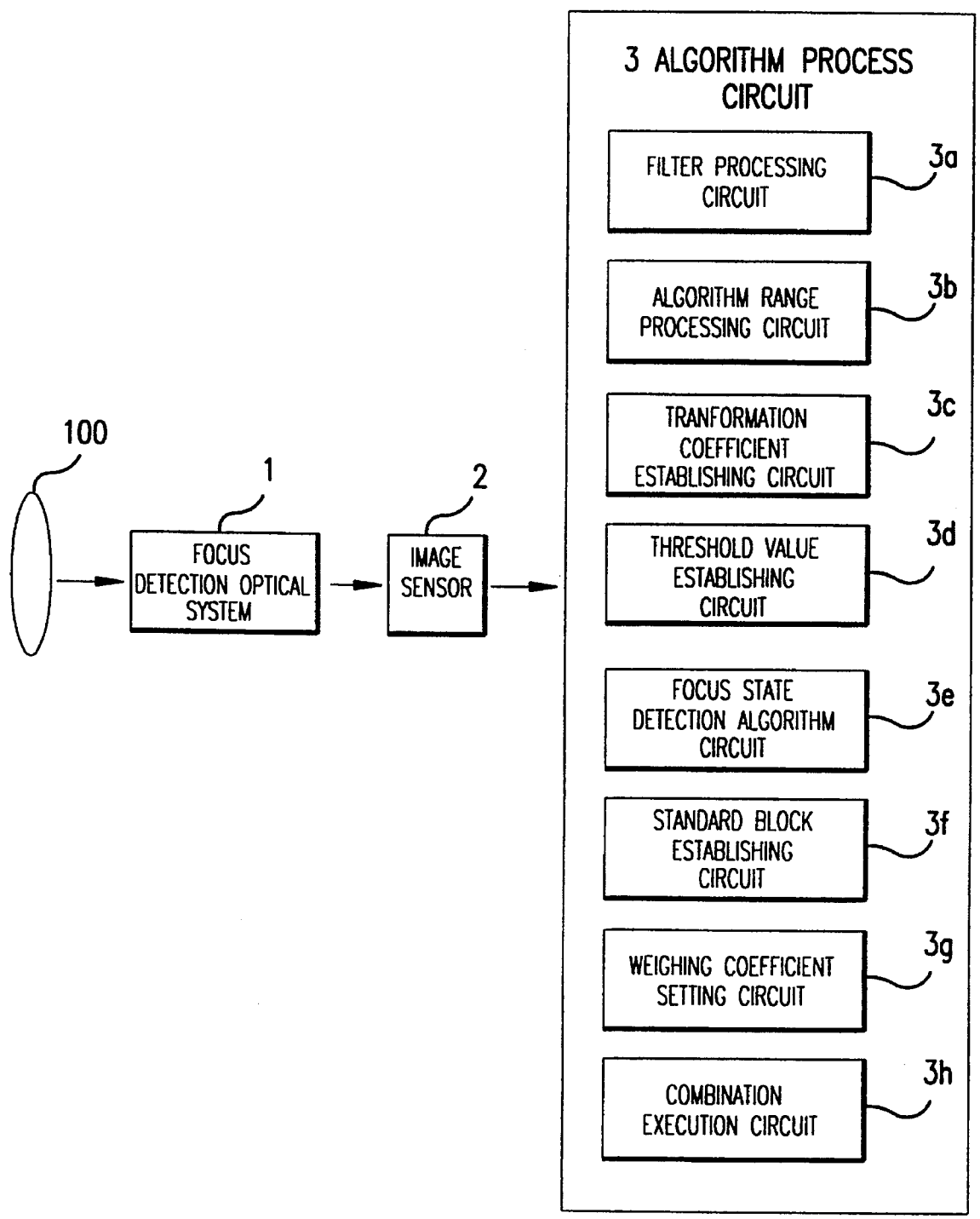
FIG. 1 is a functional block diagram according to an embodiment of the present invention.

FIG. 1 is a functional block diagram according to an embodiment of the present invention.

A focus state detection optical system 1 guides light rays from an object which have passed through the shooting lens 100 to an image sensor 2. The focus state detection optical system may comprise, for example, the arrangement shown in FIG. 14.

Figure 14:
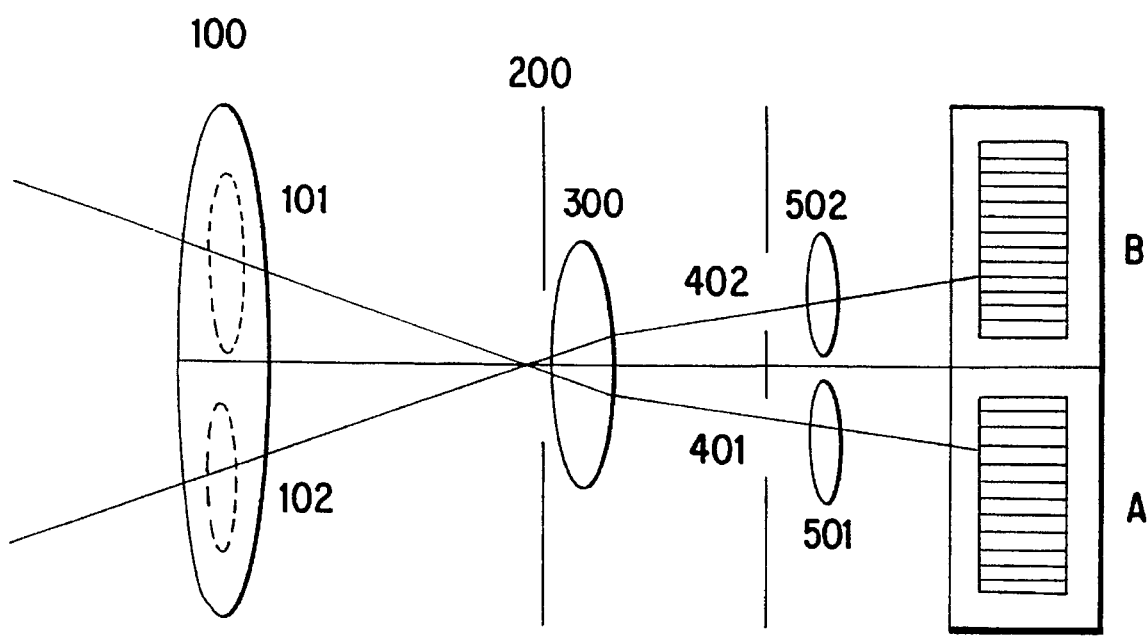
FIG. 14 is a drawing describing a structure of the conventional focus detection optical system.
Figure 15A:
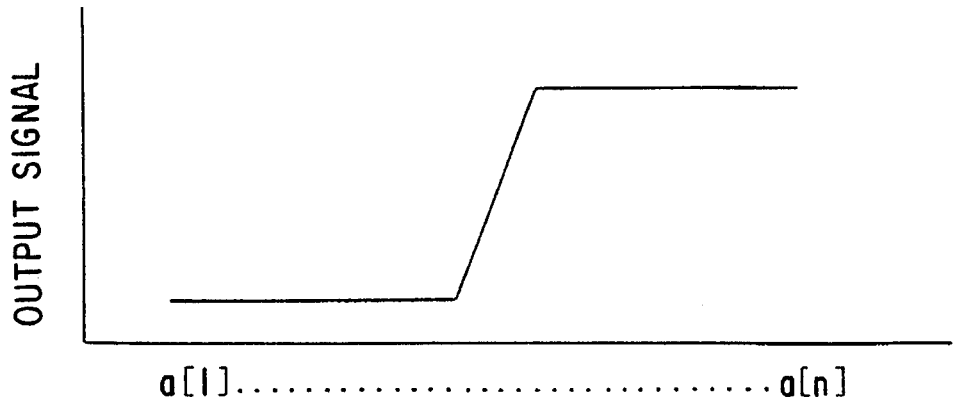
FIGS. 15(a)–15(c) are graphs describing the conventional focus detection algorithm.
Figure 15B:
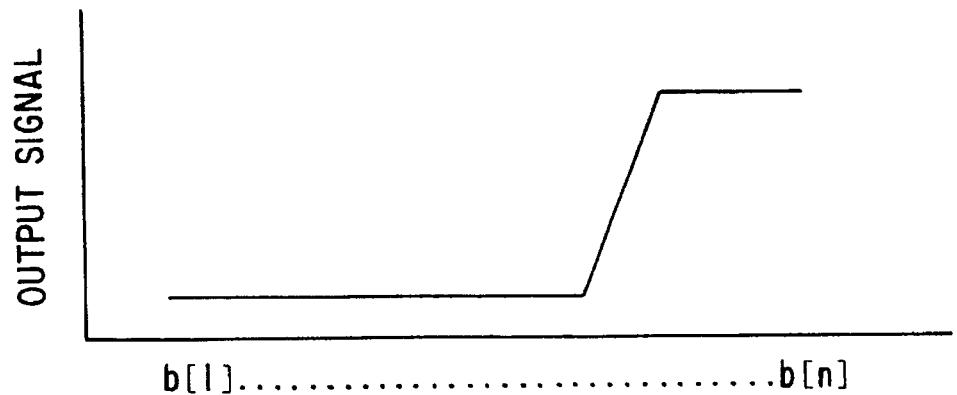
Figure 15C:
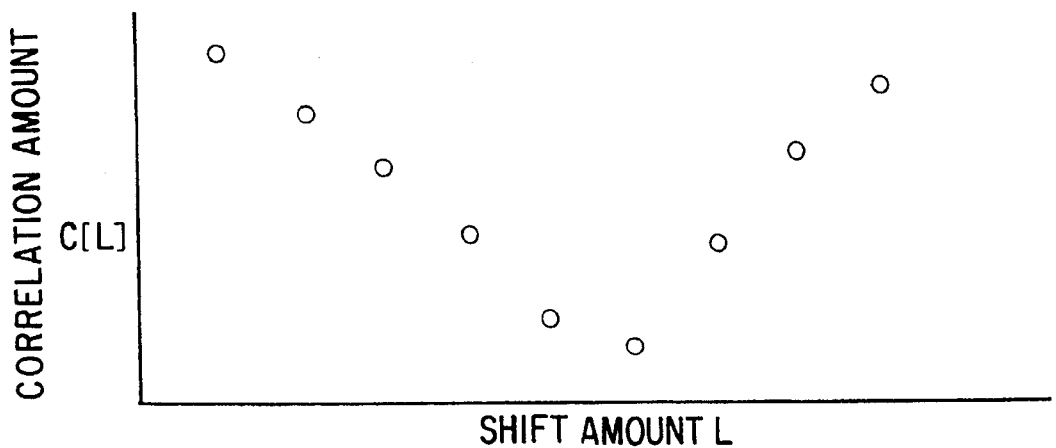
Figure 16A:
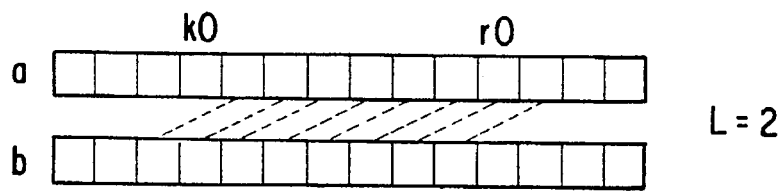
FIGS. 16(a)–16(e) are schematic drawings describing the conventional correlation algorithm.
Figure 16B:
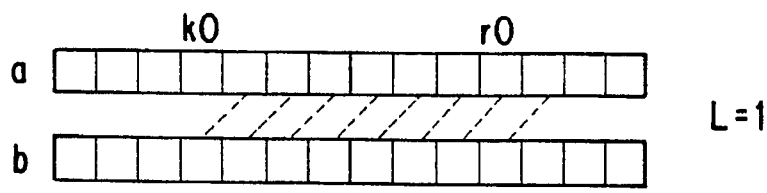
Figure 16C:
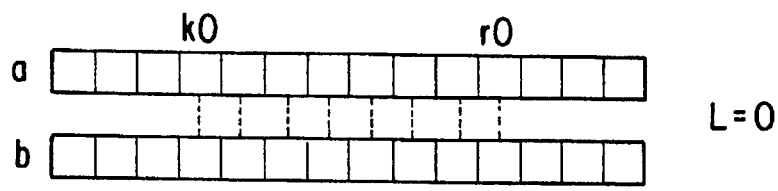
Figure 16D:
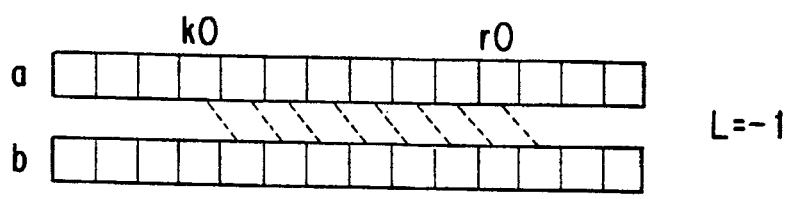
Figure 16E:
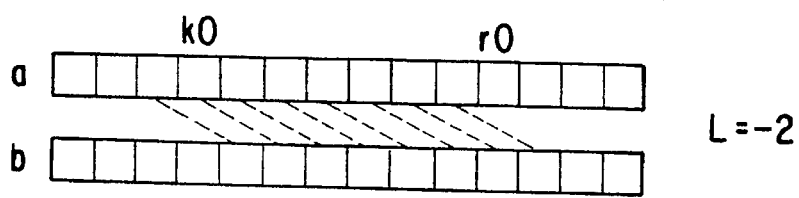
Figure 17:
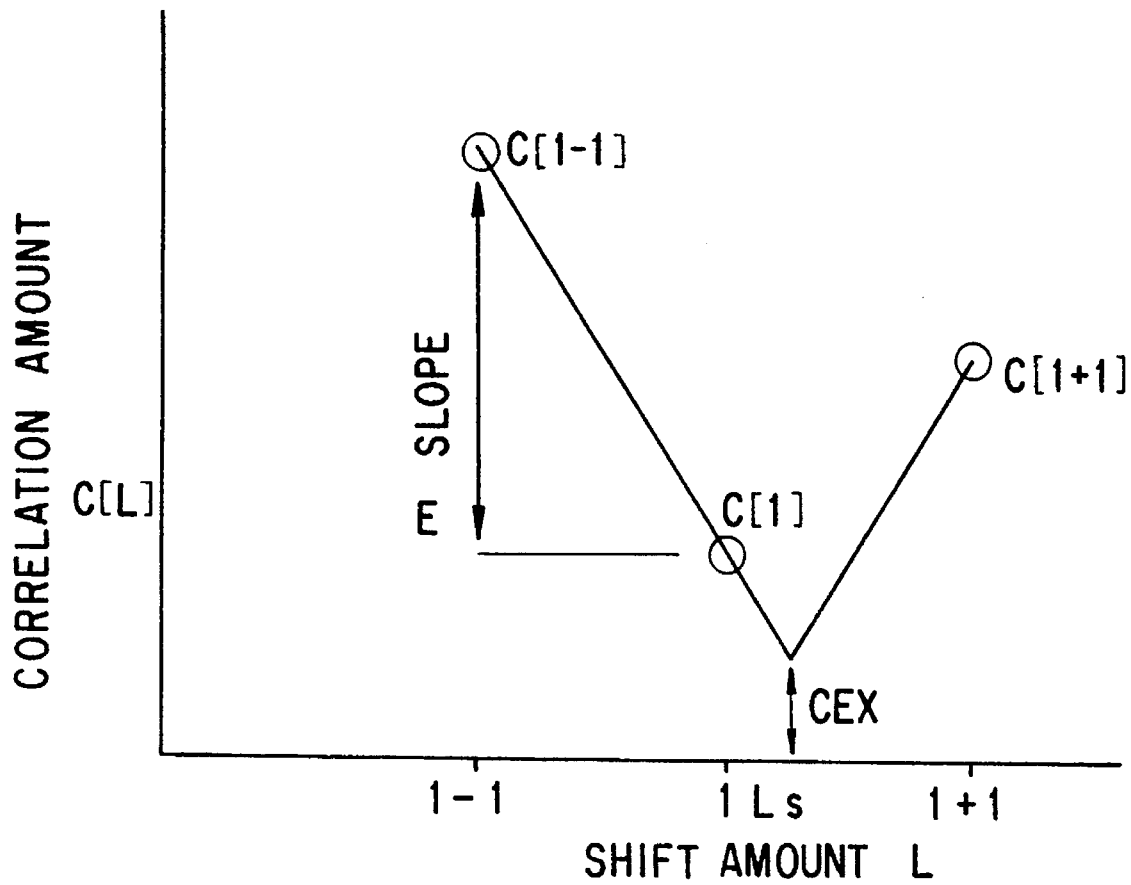
FIG. 17 is a drawing describing the conventional focus detection algorithm.
Figure 18A:
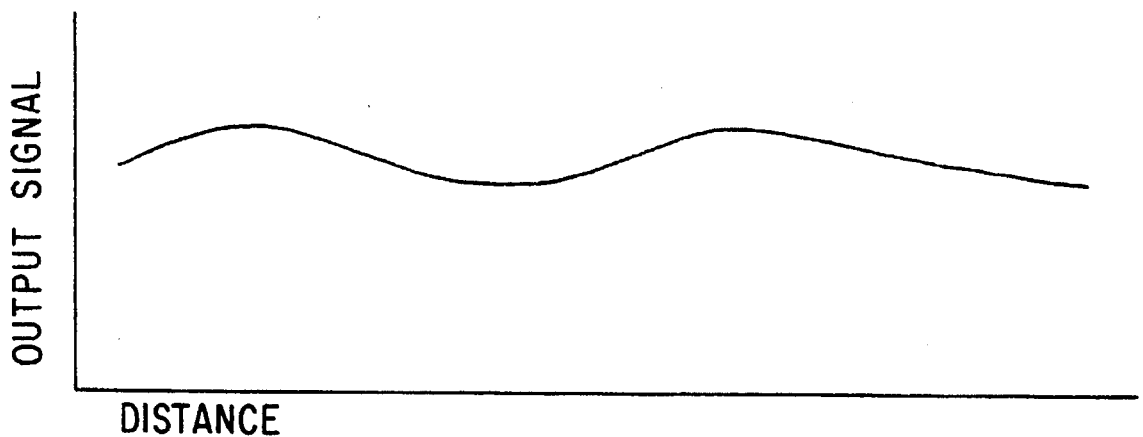
FIGS. 18(a)–18(c) are graphs describing an example of an object pattern consisting only of low frequency components.
Figure 18B:
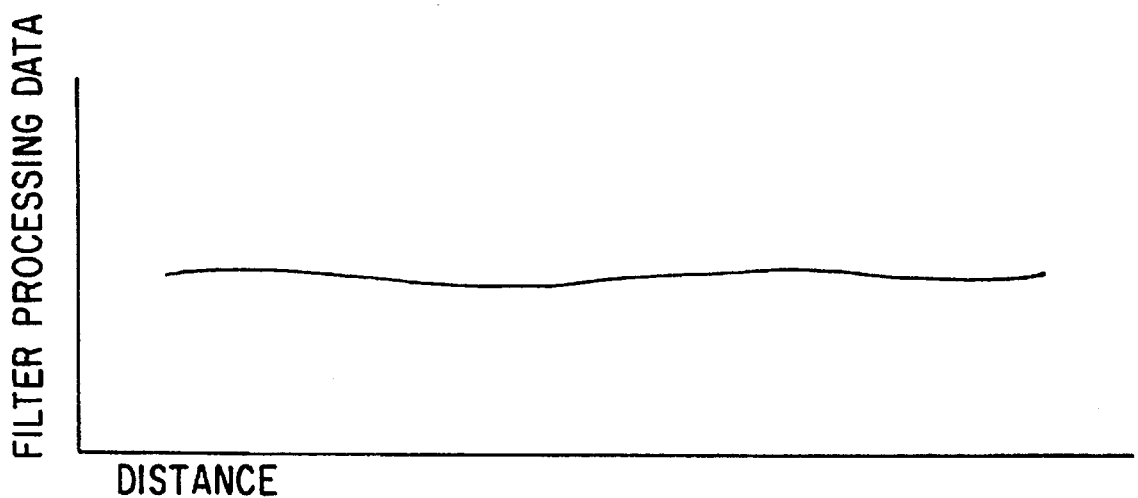
Figure 18C:
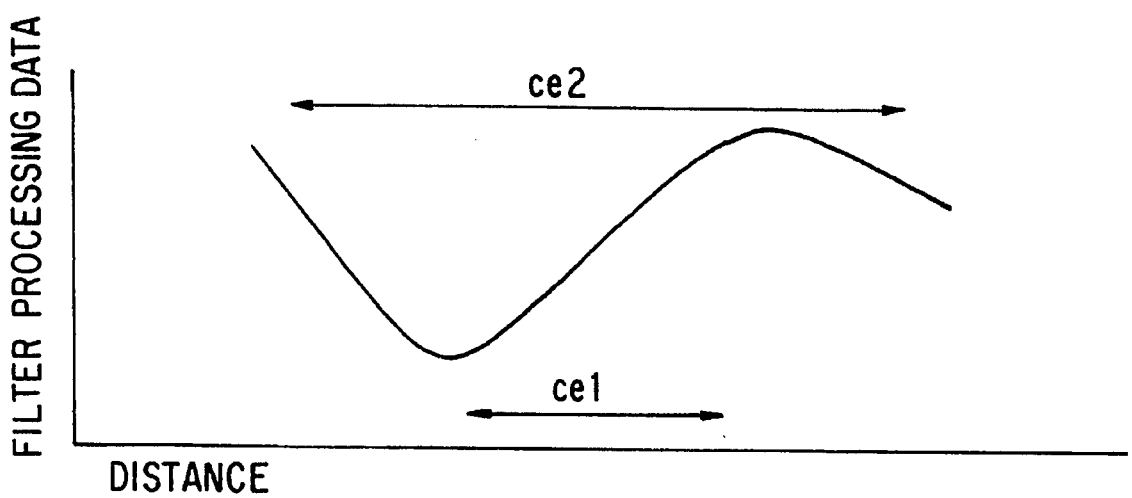
Figure 19A:
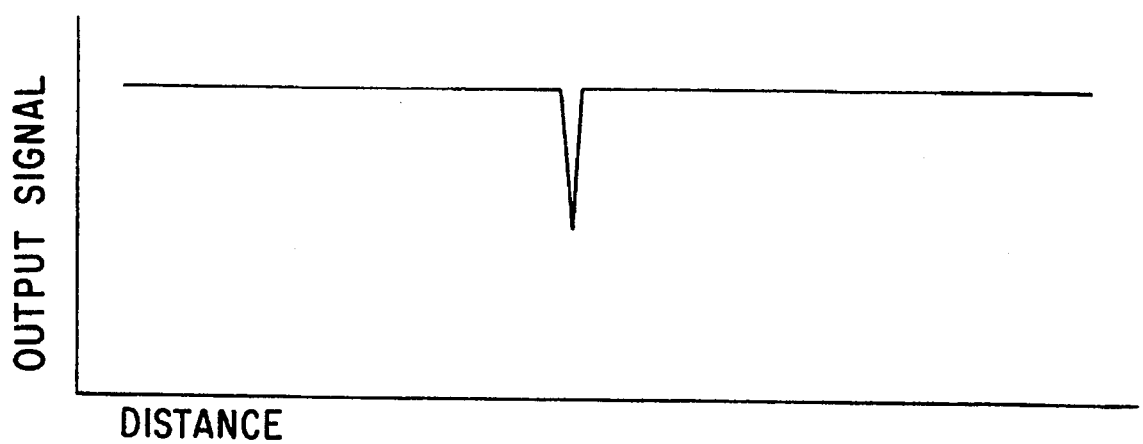
FIGS. 19(a)–19(c) are graphs describing an example of a object pattern consisting only of high frequency components.
Figure 19B:
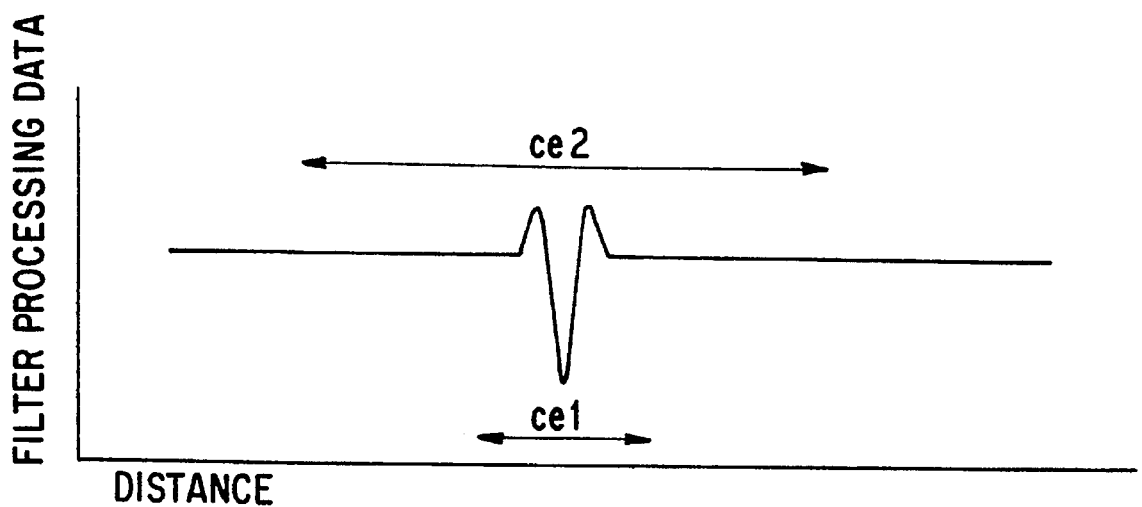
Figure 19C:
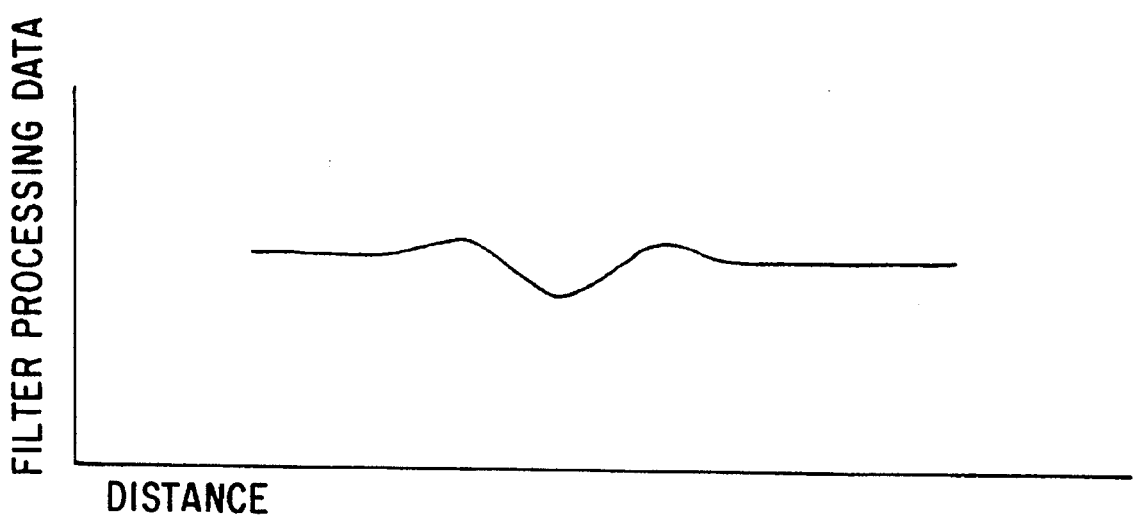
Figure 20A:
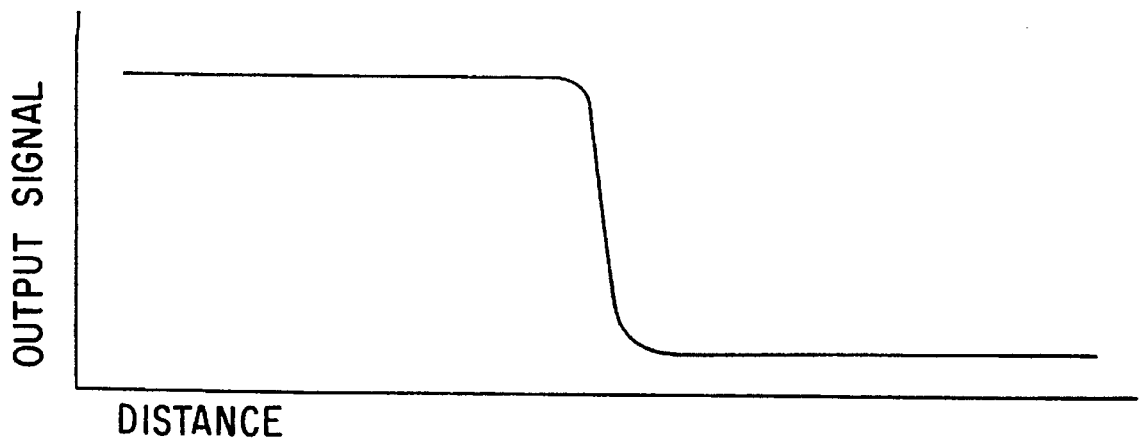
FIGS. 20(a)–20(c) are graphs describing an example of an object pattern consisting of both high and low frequency components.
Figure 20B:
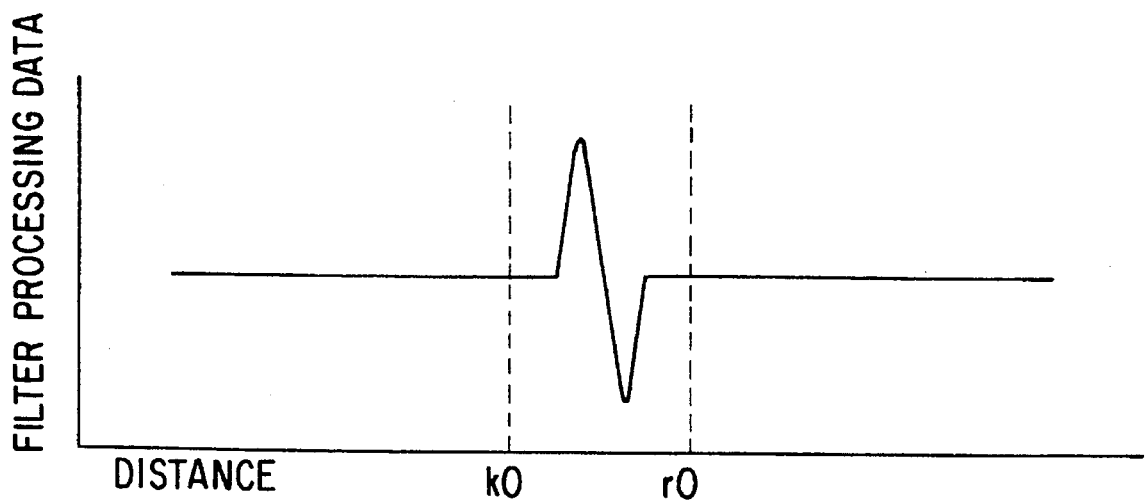
Figure 20C:
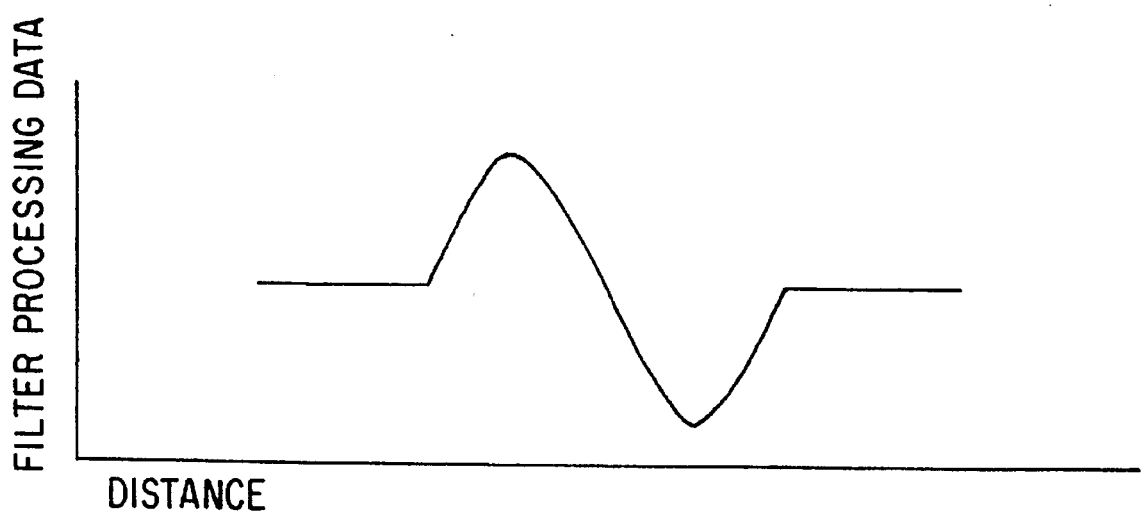
Figure 21A:
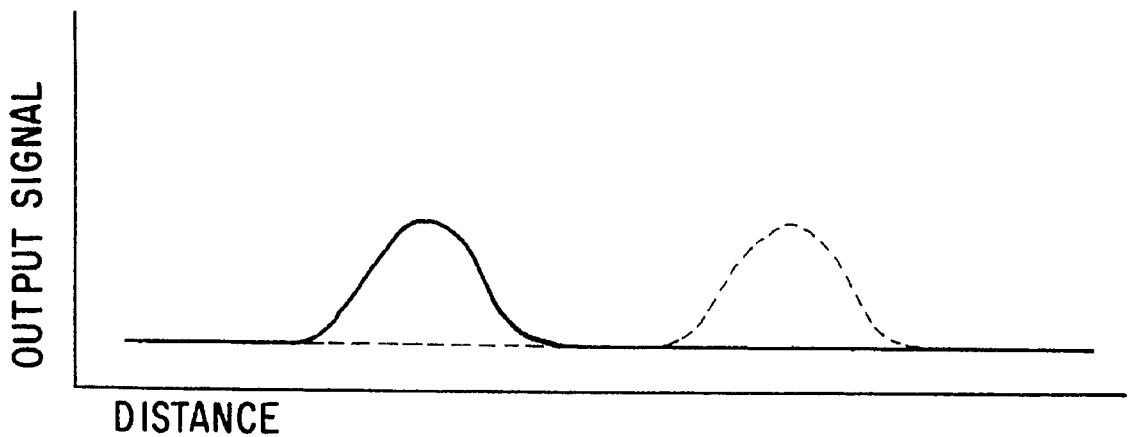
FIGS. 21(a)–21(c) are graphs describing an example of an object pattern when the defocus amount is large.
Figure 21B:
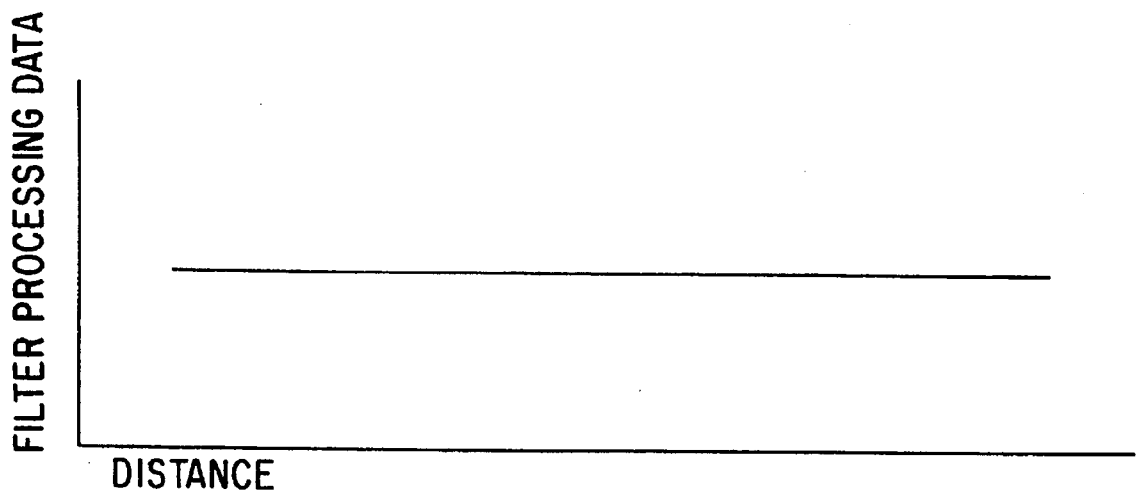
Figure 21C:
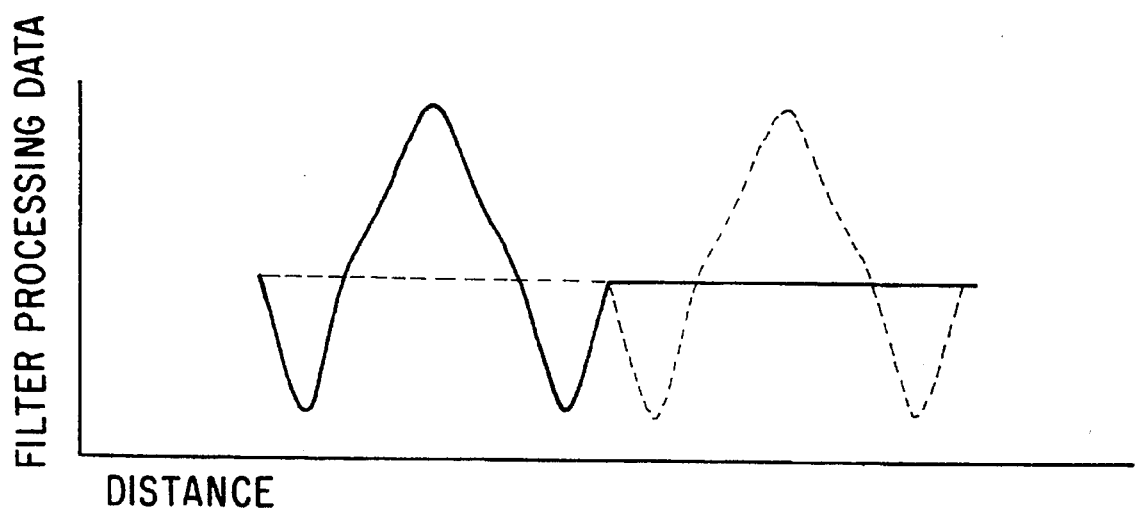
Figure 22A:
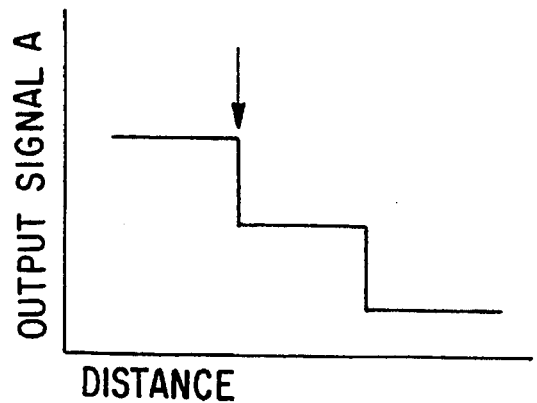
FIGS. 22(a)–22(d) are graphs describing an example of the filter processed data eliminating the DC component completely.
Figure 22B:
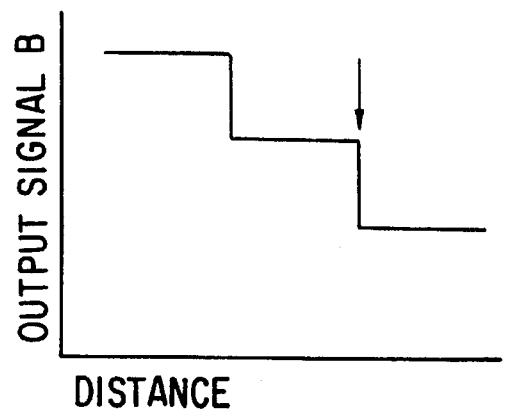
Figure 22C:
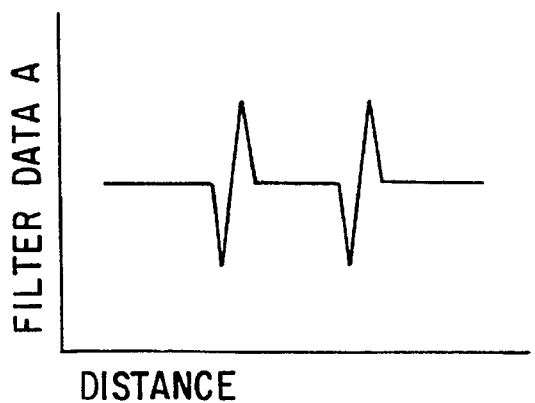
Figure 22D:
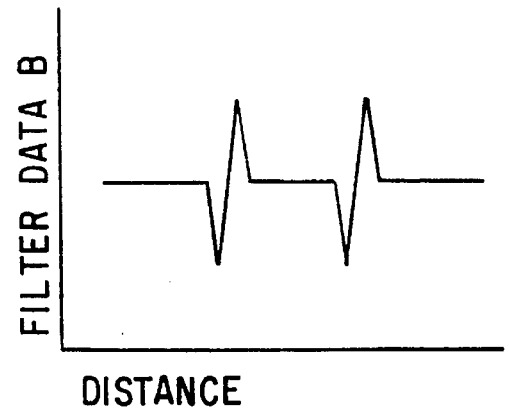

As explained with reference to FIG. 14, the image sensor 2 may include a pair of image sensor arrays comprising rows A and B, respectively. Rows A and B are each composed of a plurality of photoelectric conversion elements. In the disclosed embodiment, 52 photoelectric conversion elements are provided for each row. However, it is understood that other quantities of photoelectric conversion elements may be provided. A pair of output signal strings a[i] and b[i], each composed of 52 bits of data, are output from the image sensor arrays 2.

An algorithm process circuit 3 includes a filter processing circuit 3a, an algorithm range establishing circuit 3b, a transformation coefficient establishing circuit 3c, a threshold value establishing circuit 3d, a focus state detection algorithm circuit 3e, a standard block establishing circuit 3f, a weighing coefficient setting circuit 3g, and a combination execution circuit 3h.

The filter processing circuit 3a executes filter processing using formulae 7–9 with respect to the output signal strings a[i] and b[i] output from the image sensor 2, and outputs the DC-extraction filter processed data Fa[i] and Fb[i] and the DC reduction filter processed data Qa[i] and Qb[i]. Because the output signal strings a[i] and b[i] are each composed of 52 items of data, 50 items of high frequency component cut filter processed data Pa[i] and Pb[i] result when the filter processing of formulae 7 is conducted.

The DC-eliminating filter processing algorithms, using formulae-8, are of three types, with s=2, 4, and 8. Hereafter, the DC-eliminating filter processing algorithms where s=2, 4, and 8 will be called, respectively, the first filter processing algorithm, the second filter processing algorithm, and the third filter processing algorithm. The filter processed data obtained using each of these filter processed algorithms will be called the first filter processed data F1a[i] and F1b[i], the second filter processed data F2a[i] and F2b[i], and the third filter processed data F3a[i] and F3b[i], respectively.

The number of data in the first filter processed data F1a[i] and F1b[i] is 46 each, the number of data in the second filter processed data F2a[i] and F2b[i] is 42 each, and the number of data in the third filter processed data F3a[i] and F3b[i] is 34 each. Only one type of DC reduction filter processing algorithm, with y=2, is prepared using formulae 9, and 46 data of each of the DC reduction filter processed data Qa[i] and Qb[i] are output.

Figure 9A:
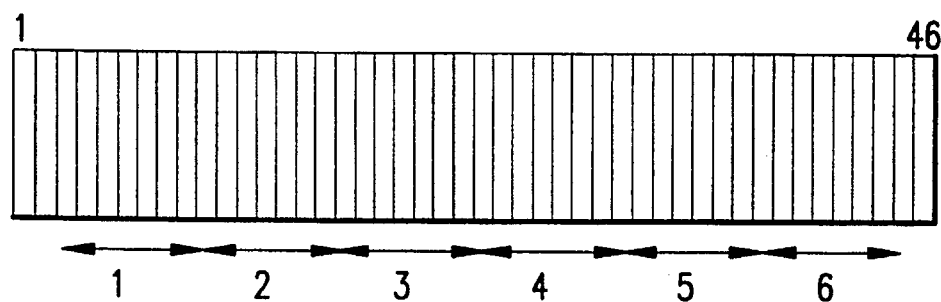
FIGS. 9(a)–(d) are schematic drawings illustrating the algorithm range setting on an image sensor array.

The algorithm range establishing circuit 3b determines the algorithm range by determining the first and last terms in accordance with the types of filter processing algorithms. With the DC reduction filter processed data, the data is divided into 6 blocks numbered block 1 to block 6 as shown in FIG. 9(a). A temporary first term kb[j] and temporary last term rb[j] are set for each block according to formulae 11.

Block 1 kb [1]=3, rb[1]=9

Block 2 kb [2]=10, rb[2]=16

Block 3 kb [3]=17, rb[3]=23

Block 4 kb [4]=24, rb[4]=30

Block 5 kb [5]=31, rb[5]=37

Block 6 kb [6]=38, rb[6]=44 (11)

Furthermore, the permanent initial terms k0[1], . . . , k0[6] and the last terms r0[1], . . . , r0[6] are set so that, to the extent possible, the portions containing contrast and the boundary positions of the blocks do not overlap with the setting made on the basis of the pattern of the DC reduction filter processed data and the temporary first terms kb[j] and the temporary last terms rb[j]. The setting method is the same as that of the above-described Japanese Unexamined Patent Publication Hei 2-135311, with the absolute value of the difference between data adjacent to the data near rb[j] and kb[j+1] computed near the block boundaries, with the boundaries of the block being those portions where the absolute value of the difference is the minimum value. A detailed description of this is omitted.

Figure 9B:
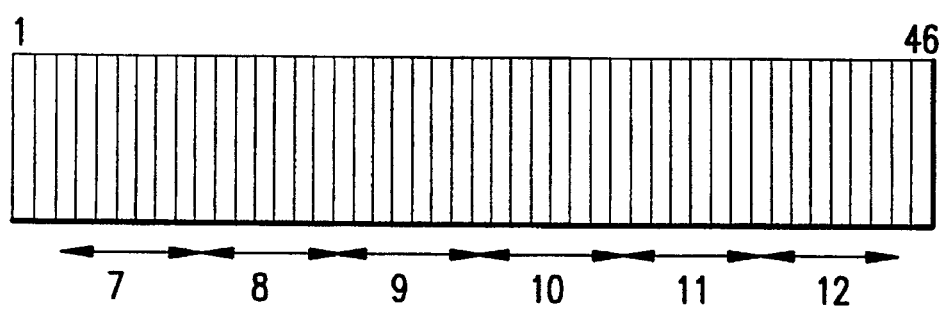

With the first filter processed data, the data is divided into 6 blocks numbered block 7 through block 12, as shown in FIG. 9(b), and the temporary first term kb[j] and the temporary last term rb[j] are set for each block according to formulae 12.

Block 7 kb[7]=3, rb[7]=9

Block 8 kb[8]=10, rb[8]=16

Block 9 kb[9]=17, rb[9]=23

Block 10 kb[10]=24, rb[10]=30

Block 11 kb[11]=31, rb[11]=37

Block 12 kb[12]=38, rb[12]=44         (12)

Furthermore, as disclosed in the above-described Japanese Unexamined Patent Publication Hei 6-82686, the absolute value of the difference between a predetermined value and the data near the block boundary, i.e., data near rb[j] and kb[j+1], is computed, and the permanent terms k0[7], . . . , k0[12] and the last terms r0[7], . . . , r0[12] are set on the basis of the absolute value of this difference. A detailed description of this is omitted here.

Figure 9C:
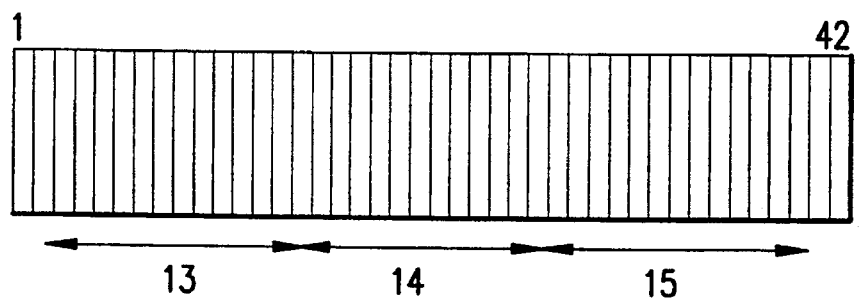

With the second filter processed data, the data is divided into 3 blocks numbered block 13 through block 15, as shown in FIG. 9(c), and the temporary first term kb[j] and the temporary last term rb[j] are set for each block according to formulae 13.

Block 13 kb[13]=3, rb[13]=15

Block 14 kb[14]=16, rb[14]=27

Block 15 kb[15]=28, rb[15]=40         (13)

Furthermore, the permanent initial terms k0[13], k0[14], and k0[15] and the last terms r0[13], r0[14], and r0[15] are set the same as in the case of the first filter processed data on the basis of the second filter processed data pattern and the temporary initial terms kb[j] and the temporary last terms rb[j].

Figure 9D:
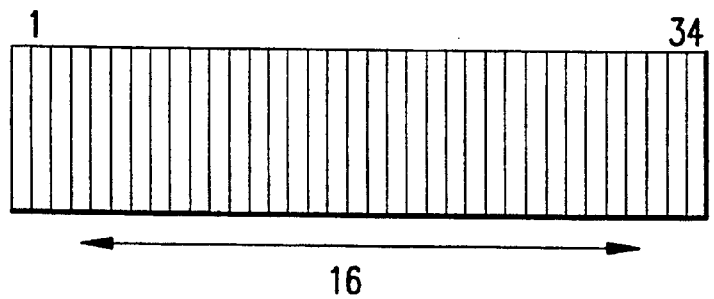

With the third filter processed data, one block 16 is set, as shown in FIG. 9(d), with the algorithm range set according to formula 14 below.

Block 16 kb[16]=4, rb[16]=31         (14)

With the third filter processed data, block boundary position setting based on the object pattern is not conducted.

The transformation coefficient determination circuit 3c establishes the K-factor Kf (hereafter execution K-factor) to be used for each block in formulae 5 based on the filter processed data pattern. The method of establishing the execution K-factor is explained below.

The K-factor Kc[k] described in formulae 15 is established for a portion of the photo-electric conversion elements in the image sensor array rows A and B.

Photo-electric conversion element 2 . . . Kc[1],

Photo-electric conversion element 10 . . . Kc[2],

Photo-electric conversion element 18 . . . Kc[3],

Photo-electric conversion element 26 . . . Kc[4],

Photo-electric conversion element 34 . . . Kc[5],

Photo-electric conversion element 42 . . . Kc[6],

Photo-electric conversion element 50 . . . Kc[7],         (15)

Figure 10:
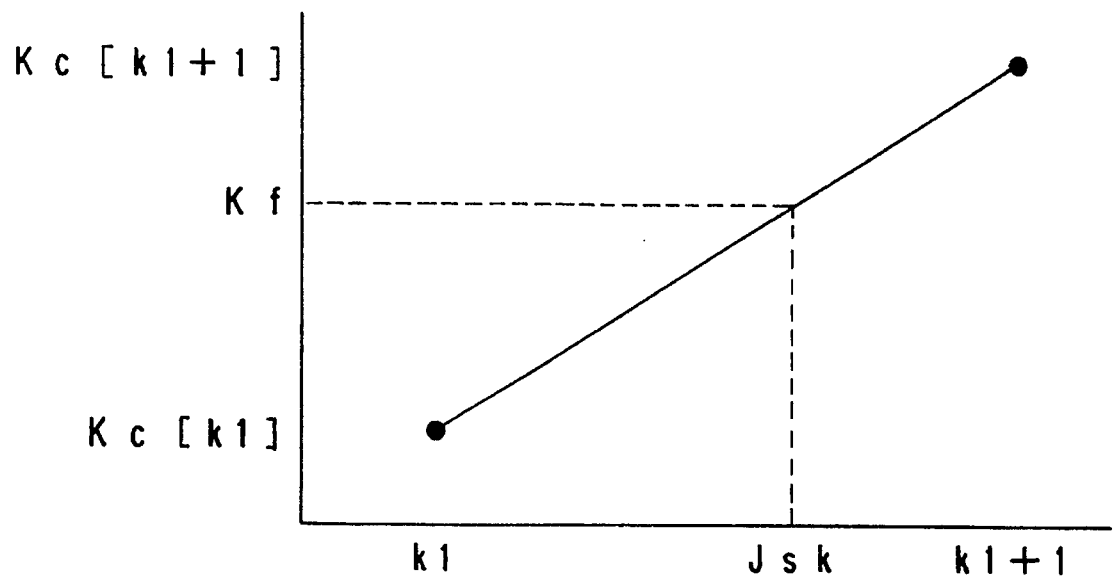
FIG. 10 is a graph describing a method of establishing the F-factor.

The K-factor Kc[k] is determined based on the design values of the focus detection optical system 1 or on experimentally determined values. In addition, the position of the center of the contrast of the filter processed data is computed for each block, and the execution K-factor corresponding to the position of the center is computed by an interpolation algorithm based on formulae 15. For example, if the position of the center Jsk corresponding to the photo-electric conversion elements is in the region between the photo-electric conversion elements kl and kl+1, as described in FIG. 10, the K-factors Kc[kl] and Kc[kl+1] are connected by a straight line, and the K-factor corresponding to the position of the center Jsk is computed by linear interpolation, which is defined as the execution K-factor Kf. The region is divided into 6 sub-regions as described in formulae 16.

First region . . . 1 to 9

Second region . . . 10 to 17

Third region . . . 18 to 25

Fourth region . . . 26 to 33

Fifth region . . . 34 to 41

Sixth region . . . 42 to 52         (16)

Figure 7:
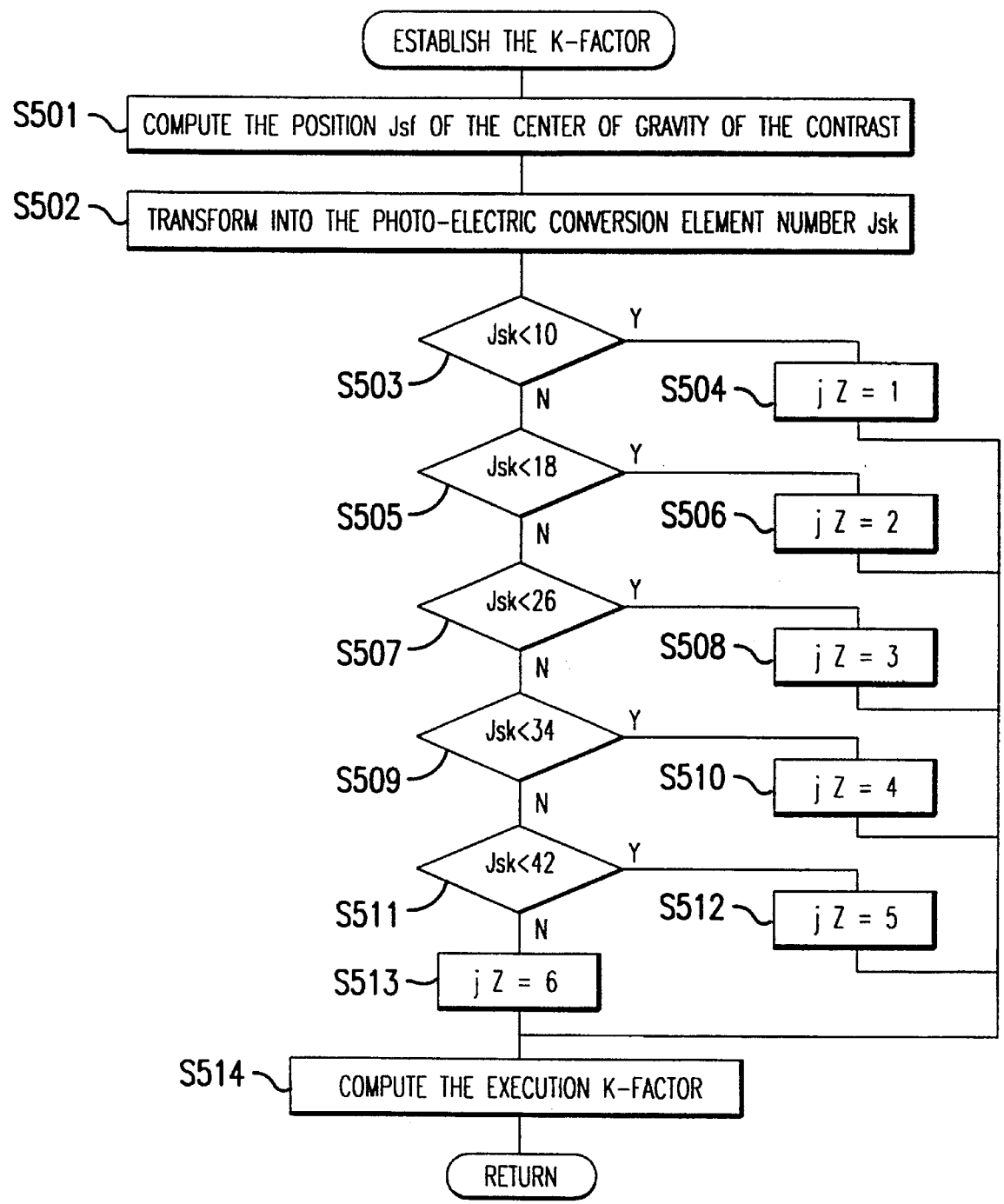
FIG. 7 is a flow chart describing the operation of a transformation coefficient determination circuit.

Hereafter, the operation to establish the execution K-factor Kf will be explained with reference to FIG. 7.

At step S501 the position of the center of the contrast Jsf within each block is computed using formula 17.

$$Jsf = \Sigma \{|A[i]-A[i+1]| \times i\} / \Sigma |A[i]-A[i+1]|$$         (17)

where i=k0 [j] to r0[j]−1.

In formula 17, A[i] denotes one of the DC reduced filter processed data Qa[i] using the output signal string a[i], the first filter processed data F1a[i], the second filter processed data F2a[i], or the third filter processed data F3a[i].

At step S502 the position of the center Jsf is converted by formulae 18 to the position of the center Jsk on the photo-electric conversion elements since Jsf is a position on the filter processed data.

DC reduced filter processed data . . . Jsk=Jsf+3

First filter processed data . . . Jsk=Jsf+3

Second filter processed data . . . Jsk=Jsf+5

Third filter processed data . . . Jsk=Jsf+9         (18)

At step S503, the position of the center Jsk is checked to see if it is smaller than the number of the 10th photo-electric conversion element. If it is smaller, the program moves to step S504, otherwise the program moves to step S505. At step S504 the program sets the numerical value jZ to 1 and moves to step S514. Here the numerical value jZ denotes the region in which the position of the center Jsk is located. At step S505 the position of the center Jsk is checked to see if it is smaller than the number of the 18th photo-electric conversion element, and if it is smaller the program moves to step S506, otherwise the program moves to step S507. At step S506 the numerical value jZ denoting the region in which the position of the center Jsk is located is changed to 2, and the program moves to step S514.

At step S507, the position of the center Jsk is checked to see if it is smaller than the number of the 26th photo-electric conversion element, and if it is smaller the program moves to step S508, otherwise the program moves to step S509. At step S508 the numerical value jZ denoting the region in which the position of the center Jsk is located is changed to 3, and the program moves to step S514.

At step S509, the position of the center Jsk is checked to see if it is smaller than the number of the 34th photo-electric conversion element, and if it is smaller the program moves to step S510, otherwise the program moves to step S511. At step S510 the numerical value jZ denoting the region in which the position of the center Jsk is located is changed to 4, and the program moves to step S514.

At step S511 the position of the center Jsk is checked to see if it is smaller than the number of the 42nd photo-electric conversion element, and if it is smaller the program moves to step S512, otherwise the program moves to step S513. At step S512 the numerical value jZ denoting the region in which the position of the center Jsk is located is changed to 5, and the program moves to step S514. Moreover, at step S513 the numerical value jZ denoting the region in which the position of the center Jsk is located is changed to 6, and the program moves to step S514.

At step S514 the process is completed after computing the execution K-factor Kf using formula 19 based on the position of the center Jsk, the region jZ in which Jsk is located, and the K-factors Kc [jZ] and Kc[jZ+1].

$$Kf=Kc[jZ]+(Kc[jZ+1]-Kc[jZ])/8\times\{Jsk-2-8\times(jZ-1)\} \quad (19)$$

Because the K-factor at the position of the center of the contrast is computed through this process, the correct K-factor is established regardless of the position of the object pattern.

The threshold value establishing circuit $3d$ establishes the threshold values E1 and G1 to be used in the determination process of formulae 26, which will be explained later. These values differ according to the types of filter processing and are established as described in formulae 20.

DC reduced filter processed data . . . E1=Ea1, G1=Ga1,

First filter processed data . . . E1=Eb1, G1=Gb1,

Second filter processed data . . . E1=Ec1, G1=Gc1,

Third filter processed data . . . E1=Ed1, G1=Gd1  (20)

The threshold values thus established satisfy the relationship described in formulae 21.

$$Ea1 \leq Eb1 \leq Ec1 \leq Ed1 \; Ga1 \leq Gb1 \leq Gc1 \leq Gd1 \quad (21)$$

The focus detection algorithm circuit $3e$ executes the algorithms of formulae 1–5 for each block using one of the DC reduced filter processed data, the first filtering processing data, the second filtering processing data, or the third filtering processing data, and computes the defocus amount Df[j], the information amount E[j], and the true local minimum Cex[j]. Moreover, it executes the determination process of formulae 22 instead of formulae 6 using E[j] and Cex[j] and declares the block satisfying the conditions as "detection capable" and declares the block not satisfying the conditions as "detection incapable."

$$E[j]>E1 \text{ and } (Cex[j]+Ct1)/E[j]<G1 \quad (22)$$

These conditions are stricter than the conditions used to determine the local minimum Cex in formulae 6 by the term in formula 23.

$$Ct1/S[j] \quad (23)$$

This term can be ignored if the information amount E[j] is sufficiently larger than the constant Ct1. In other words, the determination by formulae 6 is approximately equal to the determination by formulae 22 if the information amount E[j] is sufficiently larger than the constant Ct1. On the other hand, if the information E[j] is not so large, it cannot be ignored. Hence, the determination of the local minimum value Cex in formulae 22 becomes stricter than the determination by formulae 6. Thus, a condition wherein the information amount E exceeds the threshold value E1 only slightly and Cex/E falls slightly below G1 cannot be determined as having a high level of confidence based on formulae 6. On the other hand, a condition in which the information amount E exceeds the threshold value E1 slightly and Cex/E falls substantially below G1 is determined as having a high level of confidence, as in the past. Here, it is desirable to establish the constant Ct1 corresponding to the threshold values E1 and G1 established by the threshold establishing circuit $3d$, and Ct1 should be about ⅙ of the product of E1 and G1. By so doing, the present invention can cope with cases in which several filter processing algorithms are used with different threshold values for each filter processing algorithm, as described in the present embodiment.

Figure 8:
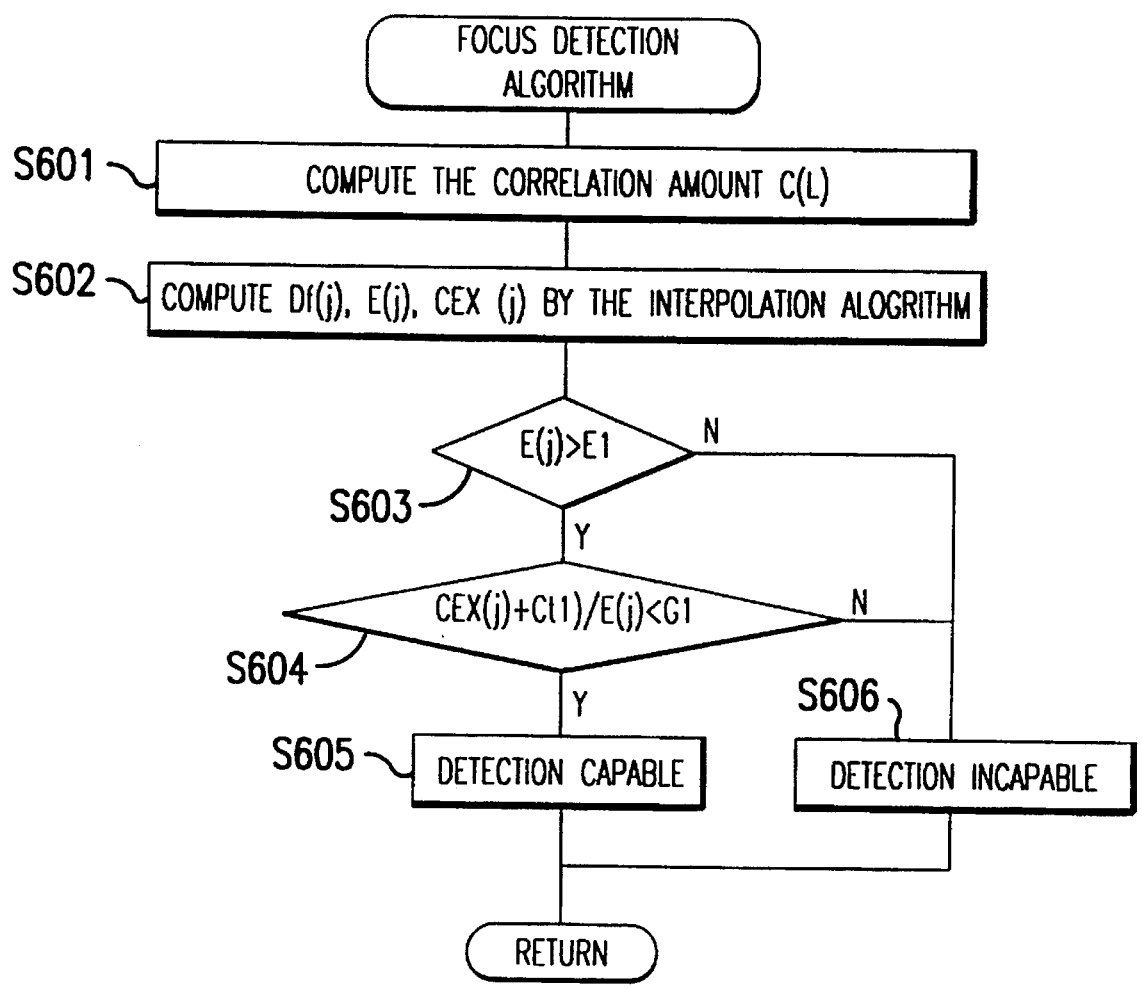
FIG. 8 is a flow chart describing the operation of a focus detection algorithm circuit.

Hereafter, the algorithm process in the focus detection algorithm circuit $3e$ will be explained with reference to the flow chart in FIG. 8.

At step S601, the correlation amount C[L] is computed using formulae 1 and 2, after which the defocus amount Df[j], the information amount E[j], and the true local minimum Cex[j] are computed using formulae 3–5 at step S602. At step S603 the information amount E[j] is checked to see if it satisfies formula 24.

$$E[j]>E1 \quad (24)$$

This condition is the same as the condition used in the determination of the information amount E in formula 22. If the information amount E[j] satisfies formula 24, the program moves to step S604, otherwise the program moves to step S606. At step S604 determination using formula 25 is executed.

$$(Cex[j]+Ct1)/E[j]<G1 \ldots (25)$$

This condition is the same as the condition used in the determination of the local minimum Cex in formula 22. If this condition is satisfied, the program moves to step S605, otherwise the program moves to step S606. At step S605, because the condition of formula 22 is satisfied, the process is completed with a declaration of "detection capable." At step S606, because the condition of formula 22 is not satisfied, the process is completed with a declaration of "detection incapable."

The term in formula 23 never becomes 0 as long as the information amount E[j] is finite, which makes the determination of formulae 22 always stricter than the conventional determination of formulae 6. If this causes a problem, setting of the constant Ct1 to 0 when the information amount E[j] becomes larger than the predetermined value makes the determination by formulae 22 the same as the determination by formulae 6 as long as the information amount E[j] is larger than the predetermined value. Alternatively, the determination of the minimum by formulae 22 can be replaced by the determination by formula 26.

$$(Cex[j]+Ct1)/(E[j]+Ct2)<G1 \qquad (26)$$

Here, by assigning a large value for Ct2 when the information amount E[j] is large and a smaller value for Ct2 when E[j] is small, the determination can be made to be the same as the determination of formulae 6 when the information amount E[j] is large.

The standard block establishing circuit 3f selects and designates the block having the defocus amount with the shortest distance or displaying the maximum information amount, for example, as the standard block and defines the defocus amount and the information amount of the standard block as the standard defocus amount Dfk and the standard information amount E, respectively.

Figure 11:
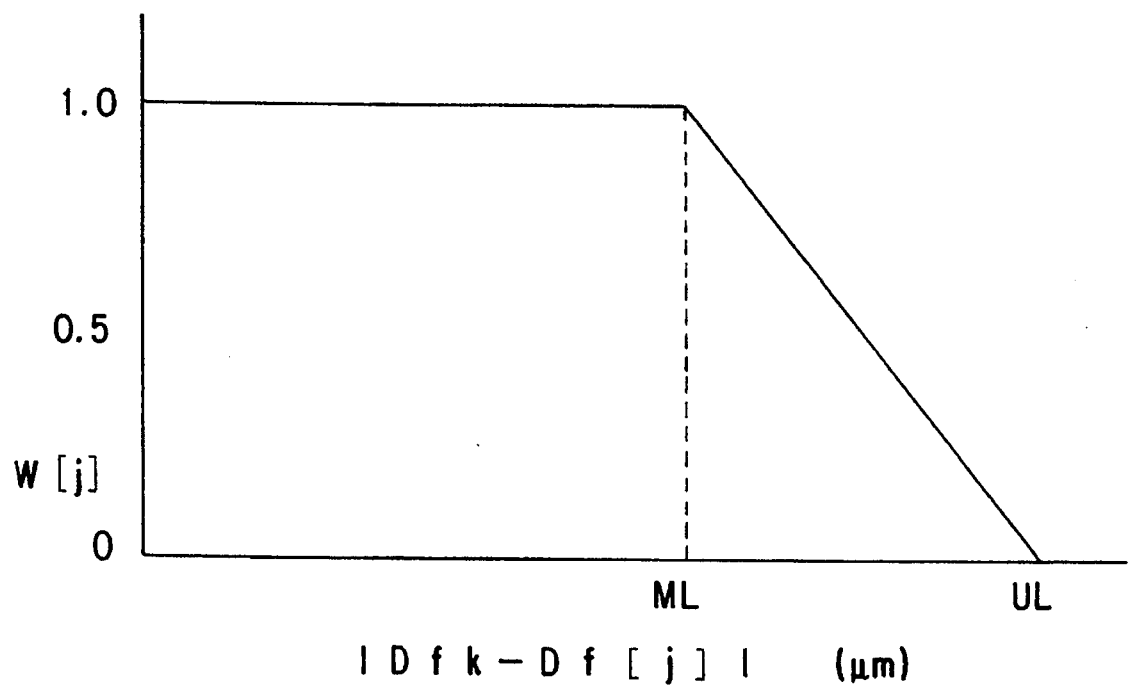
FIG. 11 is a graph describing a method of establishing the weighing coefficient.
Figure 12A:
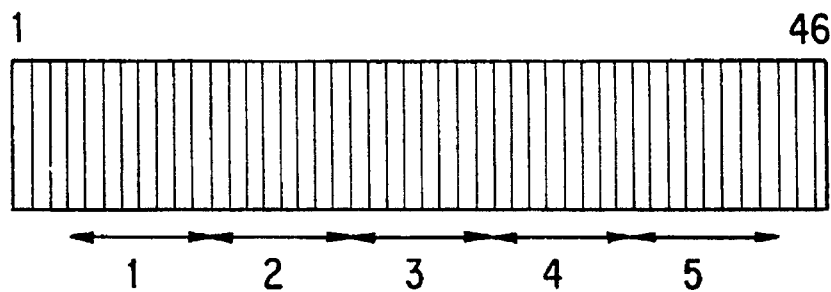
FIGS. 12(a) and 12(b) are schematic drawings describing the conventional block division.
Figure 12B:
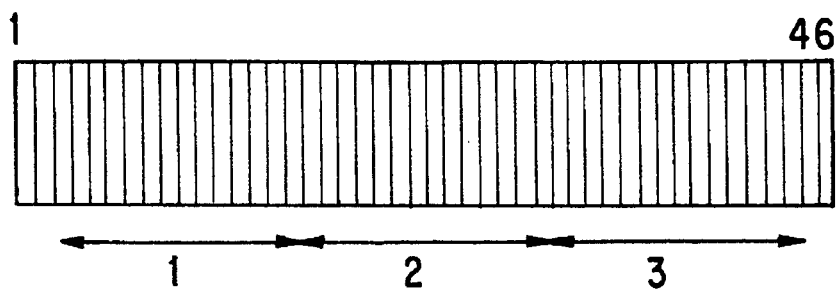
Figure 13:
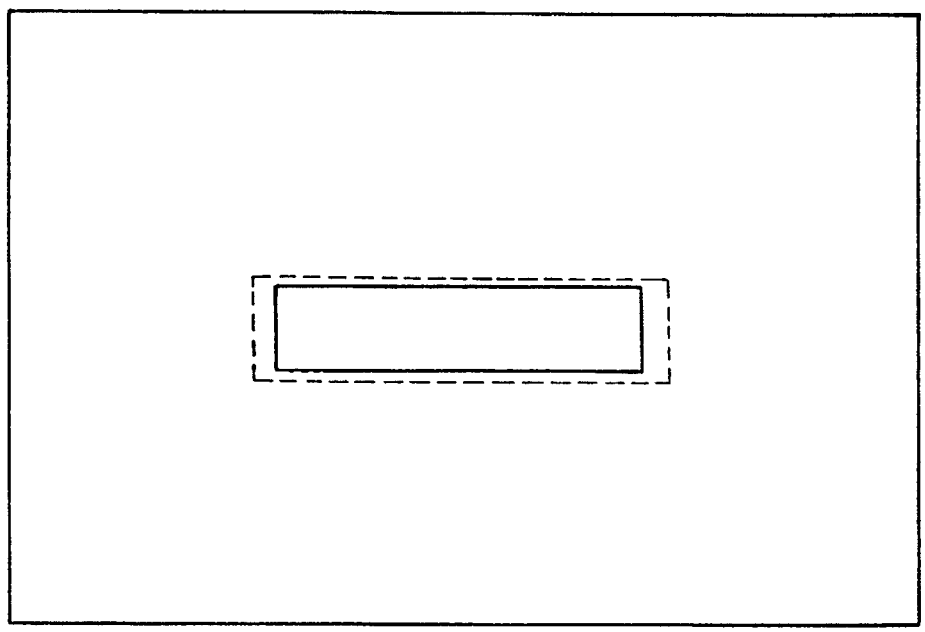
FIG. 13 is a drawing describing the positional relationship between the conventional shooting field and the focus detection area.

The weighing coefficient setting circuit 3g establishes the weighing coefficient W[j] for each of blocks 1–13, as described in FIG. 11, based on the absolute value Dev of the difference of the defocus amount Df[j] of each block from the standard defocus amount Dfk. The following formulae describe the above mathematically.

Dev=|Df[j]–Dfk|,

If Dev>UL, then W[j]=0

If Dev ≧ML, then W[j]=1

If ML<Dev≦UL, then W[j]=1–(Dev–ML)/(UL–ML) (27)

Here, the weighing coefficient W[j] is 0 for the detection incapable blocks.

The combination execution circuit 3h combines the defocus amounts of blocks 1–13 using formulae 10 and computes the combined defocus amount Dfm and the combined information amount Em. Since the weighing coefficient W[j] is 0 for the detection incapable blocks, the combination algorithm is not used there.

The algorithm execution circuit 3 can be realized by a microcomputer.

Figure 2:
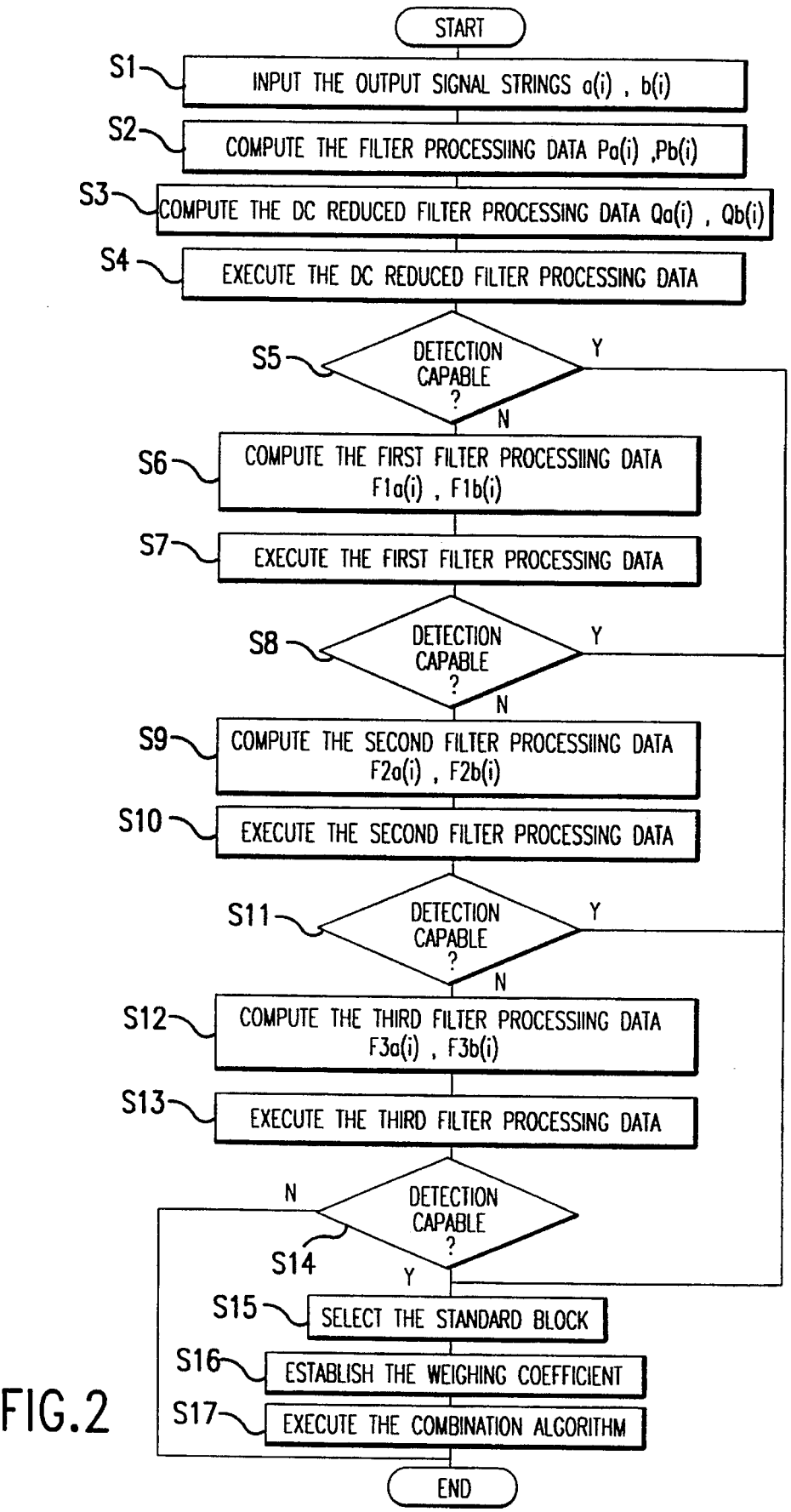
FIG. 2 is a flow chart describing the overall operation of the embodiment of FIG. 1.

Next, the overall operation of the embodiment will be described with reference to FIG. 2. The algorithm process using each of the filter processed data will be explained below.

At step S1 the output signal strings a[i] and b[i] of the image sensor 2 are entered, and then the high frequency removed filter processed data Pa[i] and Pb[i] are computed using formulae 7 at step S2. Next, at step S3 the DC reduced filter processed data Qa[i] and Qb[i] are computed using formulae 9, and at step S4 the focus detection algorithm is executed using the DC reduced filter processed data Qa[i] and Qb[i]. Details of this operation will be explained later with respect to FIG. 3. At step S5, the determination of the existence of focus detection capable blocks is made. If focus detection capable blocks exist, the program moves to step S15, otherwise the program moves to step S6. At step S6 the first filter processed data F1a[i] and F1b[i] are computed using formulae 8, and then at step S7 the focus detection algorithm is executed using the first filter processed data F1a[i] and F1b[i] computed. This algorithm process will be explained later with respect to FIG. 4.

At step S8, the determination of the existence of focus detection capable blocks is made. If focus detection capable blocks exist, the program moves to step S15, otherwise the program moves to step S9. At step S9, the second filter processed data F2a[i] and F2b[i] are computed using formulae 8, and then at step S10 the focus detection algorithm is executed using the second filter processed data F2a[i] and F2b[i] computed. This algorithm process will be explained later with respect to FIG. 5.

At step S11, the determination of the existence of focus detection capable blocks is made. If focus detection capable blocks exist, the program moves to step S15, otherwise the program moves to step S12. At step S12, the third filter processed data F3a[i] and F3b[i] are computed using formulae 8, and then at step S13 the focus detection algorithm is executed using the third filter processed data F3a[i] and F3b[i] computed. This algorithm process will be explained later with respect to FIG. 6.

At step S14 the determination is made as to whether detection is possible. If detection is possible, the program moves to step S15, otherwise the program ends the operation. At step S15, the standard block is established, as previously described, by the standard block establishing circuit 3f. Furthermore, at step S16, the weighing coefficient W[j] is established for each block, as previously described, by the weighing coefficient setting circuit 3g. Then, at step S17, the combination defocus amount Dfm is computed by the combination execution circuit 3h, which is designated as the final defocus amount.

Based on the combination defocus amount Dfm thus obtained, the shooting lens 100 is driven by a motor (not shown) or the focus adjustment condition of the shooting lens 100 is displayed on a display device (not shown). Here, steps S3, S5, S11, and S14 are operations of the filter processing circuit 3a.

Figure 3:
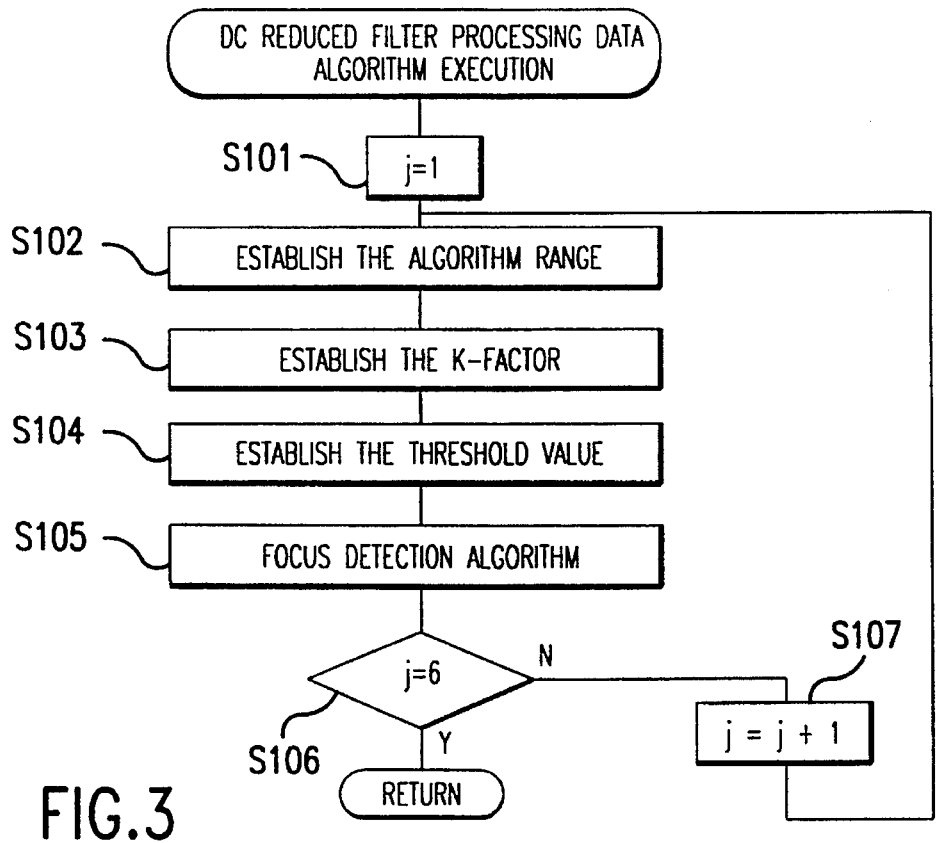
FIG. 3 is a flow chart describing the algorithm for DC reduced filter processed data.

Hereafter, the algorithm process using the DC reduced filter processed data will be explained with reference to FIG. 3.

After setting the block number j to 1 at step S101, the program moves to step S102 and establishes the algorithm range by defining the permanent first term k0[j] and the permanent last term r0[j] for block j using the algorithm range establishing circuit 3b. At step S103, the execution K-factor Kf is established by the transformation coefficient determination circuit 3c, and then at step S104, the threshold values E1 and G1 are established for the determination of the confidence level by the threshold value establishing circuit 3d. Next, at step S105, the defocus amount Df[j], the information amount E[j], and the true minimum value Cex[j] are computed by the focus detection algorithm circuit 3e to determine whether block j is capable of detection. At step S106 it is determined whether the block number j is 6, i.e., whether the focus detection algorithm based on the DC reduced filtering process data is completed in all the blocks. If j is 6, the algorithm is completed and the program ends processing, otherwise the program moves to step S107. If the focus detection algorithm is not completed, the program increments the block number j at step S107 and returns to step S102.

Figure 4:
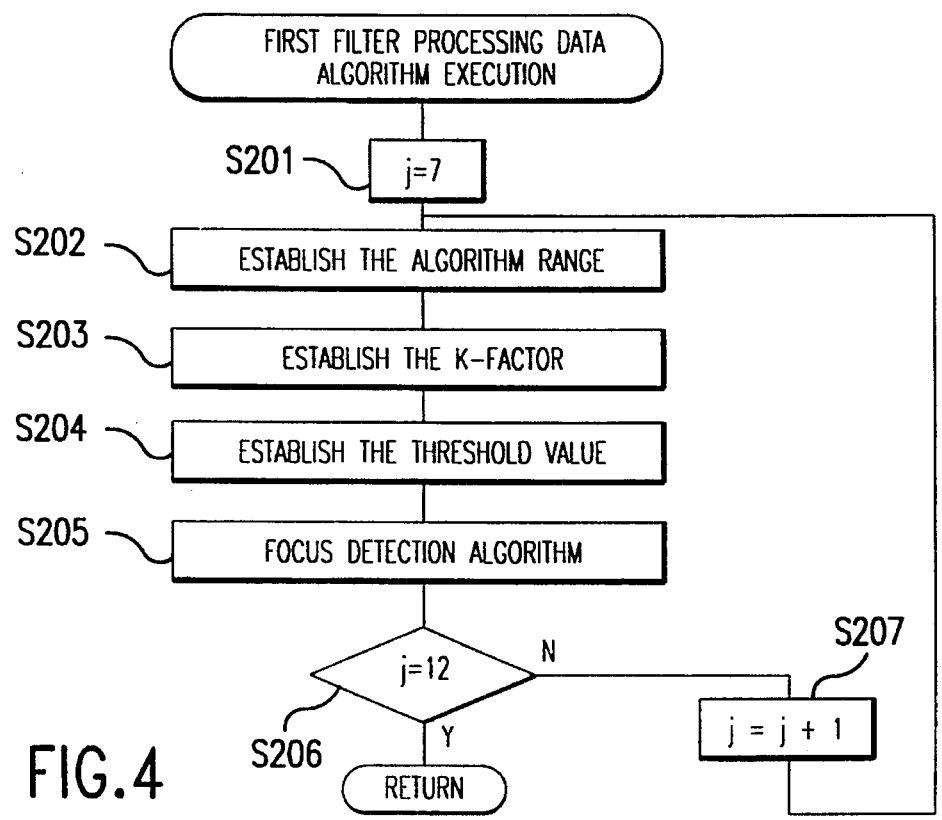
FIG. 4 is a flow chart describing the algorithm for first filter processed data.

Next, the algorithm process using the first filter processed data will be explained with reference to FIG. 4.

After setting the block number j to 7 at step S201, the program moves to step S202 and establishes the algorithm range by defining the permanent first term k0[j] and the permanent last term r0[j] for block j using the algorithm range establishing circuit 3b. At step S203 the execution K-factor Kf is established by the transformation coefficient determination circuit 3c, and then at step S204 the threshold values E1 and G1 are established for determination of the confidence level by the threshold value establishing circuit 3d. Next, at step S205 the defocus amount Df[j], the information amount E[j], and the true minimum value Cex[j] are computed by the focus detection algorithm circuit 3e to determine whether block j is capable of detection. At step S206 whether the block number j is 12, i.e., whether the focus detection algorithm based on the first filtering process data is completed in all the blocks, is determined and if the algorithm is completed the program ends processing, otherwise the program moves to step S207. If the focus detection algorithm is not completed, the program increments the block number j at step S207 and returns to step S202.

Figure 5:
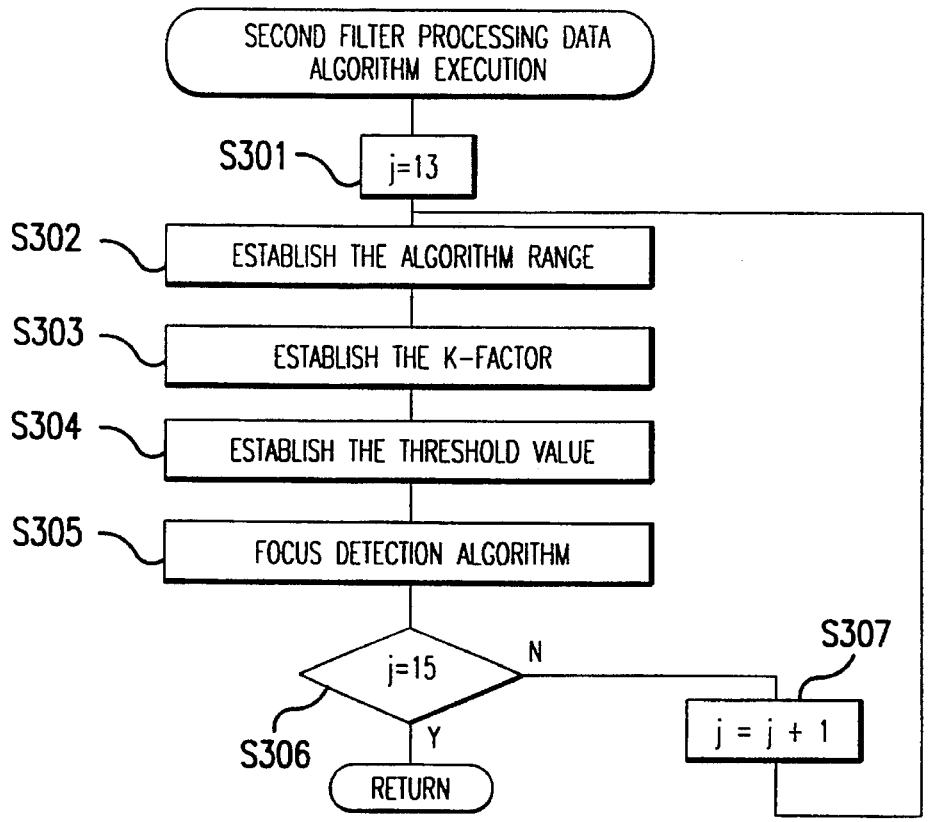
FIG. 5 is a flow chart describing the algorithm second filter processed data.

The algorithm process using the second filter processed data will be explained with reference to FIG. 5.

After setting the block number j to 13 at step S301, the program moves to step S302 and establishes the algorithm range by defining the permanent first term k0[j] and the permanent last term r0[j] for block j using the algorithm range establishing circuit 3b. At step S303 the execution K-factor Kf is established by the transformation coefficient determination circuit 3c, and then at step S304 the threshold values E1 and G1 are established for determination of the confidence level by the threshold value establishing circuit 3d. Next, at step S305 the defocus amount Df[j], the information amount E[j], and the true minimum value Cex[j] are computed by the focus detection algorithm circuit 3e to determine whether block j is capable of detection. At step S306 whether the block number j is 15, i.e., whether the focus detection algorithm based on the second filtering process data is completed in all the blocks, is determined and if the algorithm is completed the program ends processing, otherwise the program moves to step S307. If the focus detection algorithm is not completed, the program increments the block number j at step S307 and returns to step S302.

Figure 6:
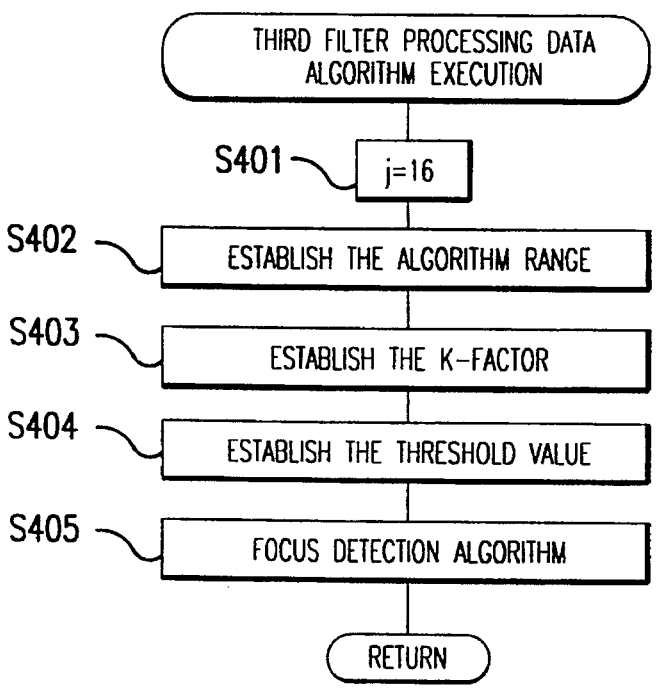
FIG. 6 is a flow chart describing the algorithm third filter processed data.

The algorithm process using the third filter processed data will be explained with reference to FIG. 6.

After setting the block number j to 16 at step S401, the program moves to step S402 and establishes the algorithm range by defining the permanent first term k0[j] and the permanent last term r0[j] for block j using the algorithm range establishing circuit 3b. At step S403 the execution K-factor Kf is established by the transformation coefficient determination circuit 3c, and then at step S404 the threshold values E1 and G1 are established for determination of the confidence level by the threshold value establishing circuit 3d. Next, at step S405 the defocus amount Df[j], the information amount E[j], and the true minimum value Cex[j] are computed by the focus detection algorithm circuit 3e to determine whether block j is capable of detection.

In the above-described embodiment, an example is used in which filter processing is performed on the output signals from the image sensor 2 by the filter processing circuit 3a, and establishment of the algorithm range, establishment of the K-factor, and execution of the focus detection algorithm are accomplished based on the filter processed data. However, the present invention can be applied to a focus detection device using the output signals directly.

Moreover, in the above-described embodiment, an example is used in which the filter processed data are divided into a plurality of blocks and setting of the transformation coefficient and execution of the focus detection algorithm are accomplished for each block. However, the present invention can be applied to a focus detection device which establishes the algorithm range only.

In the illustrated embodiment, the focus detection device controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 2–8 can be used as the controller. As shown, a distributed processing architecture is preferred for maximum data/signal processing capability and speed.

The present invention establishes the focus detection algorithm range on the photo-electric conversion element arrays based on the signal strings outputted from the photo-electric conversion element arrays and detects the contrast distribution of the output signal strings corresponding to this algorithm range. Moreover, it determines the transformation coefficients for the algorithm range based on the contrast distribution detected and the coefficients predefined for some of the plurality of photo-electric conversion elements on the photo-electric conversion element arrays, computes the relative shift amount of the output signal strings corresponding to the algorithm range, and converts the shift amount into the defocus amount of the shooting lens by the transformation coefficients. Hence, optimum transformation coefficients are obtained corresponding to the contrast distribution of the object image for the algorithm range, and a defocus amount with a high level of confidence is detected constantly. While relatively shifting the pair of output signal strings of the pair of photo-electric conversion element arrays by a specific amount within the predetermined shift range, the invention computes a correlation amount C at each shift position and detects the focus adjustment condition of the shooting lens based on the shift position corresponding to the minimum correlation amount Cex. The focus adjustment condition detected here is determined to have a high level of confidence if the change amount E of the correlation amount C in the vicinity of the shift position yielding the relatively minimum correlation amount Cex is larger than the threshold value E1 and (Cex+Ct1)/E (Here, Ct1 is a predetermined value) is smaller than the threshold value G1. Hence a focus adjustment condition with a high level of confidence is detected constantly.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What I claim is:

1. A focus detection device comprising:

a pair of photo-electric conversion element arrays including a plurality of photo-electric conversion elements that output a pair of signal strings corresponding to the light intensity distribution of a pair of object images;

a focus detection optical system that guides a pair of light rays from an object to said pair of photo-electric conversion element arrays;

an algorithm range establishing device that establishes a focus detection algorithm range on said photo-electric conversion element arrays;

a contrast detection device that detects a contrast distribution of a portion of the pair of output signal strings which corresponds to the algorithm range established by the algorithm range establishing device;

a transformation coefficient determination device that determines a transformation coefficient of said algorithm range based on the contrast distribution detected by the contrast detection device and coefficients predefined for some of the plurality of photo-electric conversion elements of said photo-electric conversion element arrays; and a focus detection algorithm device that computes a relative shift amount of the portion of the pair of output signal strings corresponding to said algorithm range and transforms the shift amount into a defocus amount of said focus detection optical system by the transformation coefficient determined by said transformation coefficient determination device.

2. The focus detection device according to claim 1 further comprising a filter process device that filter processes the pair of signal strings output from said pair of photo-electric conversion element arrays and outputs a pair of filter processed data strings, wherein said algorithm range determination device, said contrast detection device, and said focus detection algorithm device use the pair of filter processed data strings output from said filter process device.

3. The focus detection device according to claim 1, wherein said contrast detection device detects the location of a center of a contrast distribution, and said transformation coefficient determination device computes the transformation coefficient based on the location of the center of the contrast distribution and the coefficients predefined for some of the plurality of photo-electric conversion elements of said photo-electric conversion element arrays.

4. A focus detection device, comprising:

a pair of photo-electric conversion element arrays including a plurality of photo-electric conversion elements that output a pair of signal strings corresponding to the light intensity distribution of a pair of object images;

a focus detection optical system that guides a pair of light rays from an object to said pair of photo-electric conversion element arrays;

a focus detection algorithm device that: shifts the pair of output signal strings from said pair of photo-electric conversion element arrays relative to each other by a specified amount within a predetermined shift range, computes a correlation amount at each shift position, and determines a focus adjustment condition of the focus detection optical system based on the shift position corresponding to a minimum computed correlation amount; and a confidence level determination device that determines whether the determined focus adjustment condition has a high level of confidence, wherein said confidence level determination device determines that the determined focus adjustment condition has a high level of confidence when the following conditions are satisfied:

$E > E1$ and $(Cex + Ct1)/E < G1$, where: Cex is the minimum computed correlation amount; E is an amount of change in the correlation amount in a vicinity of the minimum computed correlation amount Cex; and Ct1, E1, and G1 are predetermined values.

5. The focus detection device according to claim 4, further comprising a filter process device that filter processes the pair of signal strings output from said pair of photo-electric conversion element arrays and outputs a pair of filter processed data strings, wherein said focus detection algorithm device uses a pair of filter processed data strings output from said filter process device.

6. The focus detection device according to claim 5, wherein said predetermined values E1 and G1 are selected in accordance with the type of filter process used.

7. The focus detection device according to claim 4, wherein said predetermined value Ct1 is a function of said predetermined values E1 and G1.

8. The focus detection device according to claim 7, wherein $Ct1 = E1 \times G1/6$.

9. A focus detection device comprising:

photo-electric conversion element array means including a plurality of photo-electric conversion elements for outputting a pair of signal strings corresponding to the light intensity distribution of a pair of object images;

focus detection optical system means for guiding a pair of light rays from an object to said pair of photo-electric conversion element array means;

algorithm range establishing means for establishing a focus detection algorithm range on said photo-electric conversion element array means;

contrast detection means for detecting a contrast distribution of a portion of the pair of output signal strings corresponding to the algorithm range established by the algorithm range establishing means;

transformation coefficient determination means for determining a transformation coefficient of said algorithm range based on the contrast distribution detected by the contrast detection means and on coefficients predefined for some of the plurality of photo-electric conversion elements of said photo-electric conversion element array means; and focus detection algorithm means for computing a relative shift amount of portion of the pair of output signal strings corresponding to said algorithm range and for transforming the shift amount into a defocus amount of said focus detection optical system means by the transformation coefficient determined by said transformation coefficient determination means.

10. The focus detection device according to claim 9 further comprising a filter processing means for filter processing the pair of signal strings output from said pair of photo-electric conversion element array means and for outputting a pair of filter processed data strings, wherein said algorithm range determination means, said contrast detection means, and said focus detection algorithm means use the pair of filter processed data strings output from said filter processing means.

11. The focus detection device according to claim 9, wherein said contrast detection means detects a location of a center of the contrast distribution, and said transformation coefficient determination means computes the transformation coefficient based on the location of the center of the contrast distribution detected by said contrast distribution detection means and the coefficients predefined for some of the plurality of photo-electric conversion elements on said photo-electric conversion element array means.

12. A focus detection device, comprising:

a pair of photo-electric conversion element array means including a plurality of photo-electric conversion elements for outputting a pair of signal strings corresponding to the light intensity distribution of a pair of object images;

a focus detection optical system means for guiding a pair of light rays from an object to said pair of photo-electric conversion element array means;

a focus detection algorithm means for: shifting the pair of output signal strings from said pair of photo-electric conversion element array means relative to each other by a specified amount within a predetermined shift range; computing a correlation amount at each shift position; and determining a focus adjustment condition of the focus detection optical system means based on the shift position corresponding to a minimum computed correlation amount;

a confidence level determination means for determining that the focus adjustment condition detected by said focus detection algorithm means has a high level of confidence when the following conditions are satisfied:

$$E>E1 \text{ and } (Cex+Ct1)/E<G1,$$

where: Cex is the minimum computed correlation amount; E is an amount of change in the correlation amount in the vicinity of the minimum computed correlation amount Cex; and Ct1, E1, and G1 are predetermined values.

13. The focus detection device according to claim 12, further comprising filter processing means for filter processing the pair of signal strings output from said pair of photo-electric conversion element array means and for outputting a pair of filter processed data strings, wherein said focus detection algorithm means uses the pair of filter processed data strings output from said filter processing means.

14. The focus detection device according to claim 13, wherein said predetermined values E1 and G1 are selected in accordance with the type filter process used.

15. The focus detection device according to claim 12, wherein said predetermined value Ct1 is a function of said predetermined values E1 and G1.

16. The focus detection device according to claim 15, wherein $Ct1=E1 \times G1/6$.

17. A focus detection method, comprising the steps of:

outputting a pair of signal strings corresponding to the light intensity distribution of a pair of object images from a pair of photo-electric conversion element arrays having a plurality of photoelectric conversion elements;

guiding a pair of light rays from an object to said pair of photo-electric conversion element arrays;

establishing a focus detection algorithm range on said photo-electric conversion element arrays;

detecting a contrast distribution of a portion of the pair of output signal strings corresponding to the algorithm range; determining a transformation coefficient of said algorithm range based on the contrast distribution and on coefficients predefined for some of the plurality of photo-electric conversion elements of said photo-electric conversion element arrays; and computing a relative shift amount of the portion of the pair of output signal strings corresponding to said algorithm range and transforming the shift amount into a defocus amount by the determined transformation coefficient.

18. The method according to claim 17 further comprising the step of filter processing the pair of signal strings output from said pair of photo-electric conversion element arrays and outputting a pair of filter processed data strings.

19. The method according to claim 17, wherein said contrast distribution step further comprises detecting a location of a center of the contrast distribution based on a portion of the output signal strings corresponding to the algorithm range established, and said transformation coefficient determining step further comprising the step of computing the transformation coefficient based on the location of the center of the contrast distribution and the coefficients predefined for some of the plurality of photo-electric conversion elements on said photo-electric conversion element arrays.

20. A focus detection method, comprising the steps of:

outputting a pair of signal strings corresponding to the light intensity distribution of a pair of object images from a pair of photo-electric conversion element arrays having a plurality of photoelectric conversion elements;

guiding a pair of light rays from an object to said pair of photo-electric conversion element arrays;

shifting the pair of output signal strings of said pair of photo-electric conversion element arrays relative to each other by a specified amount within a predetermined shift range;

computing a correlation amount at each shift position;

detecting a focus adjustment condition based on a shift position corresponding to a minimum computed correlation amount; and determining whether the focus adjustment condition has a high level of confidence, wherein said focus adjustment condition is determined to have a high level of confidence when the following conditions are satisfied:

$$E>E1 \text{ and}$$

$$(Cex+Ct1)/E<G1,$$

where: Cex is the minimum computed correlation amount; E is an amount of change in the correlation amount in a vicinity of the minimum computed correlation amount Cex; and Ct1, E1, and G1 are predetermined values.

21. The method according to claim 20, further comprising the step of filter processing the pair of signal strings output from said pair of photo-electric conversion element arrays and outputting a pair of filter processed data strings.

22. The method according to claim 21, further comprising the step of selecting said predetermined values E1 and G1 in accordance with the particular filter process used.

23. The method according to claim 20, further comprising the step of determining the value of Ct1 based on the values of E1 and G1.

24. The method according to claim 23, further comprising the step of calculating Ct1 through the formula:

$$Ct1=E1 \times G1/6.$$

* * * * *